United States Patent
Ye

(10) Patent No.: US 12,478,614 B2
(45) Date of Patent: Nov. 25, 2025

(54) INHIBITORS OF GLUTATHIONE S-TRANSFERASES (GSTS) AND NAD(P)H:QUINONE OXIDOREDUCTASE 1 (NQO1), PHARMACEUTICAL COMPOSITIONS, AND USES IN MANAGING CANCER

(71) Applicant: Emory University, Atlanta, GA (US)

(72) Inventor: Keqiang Ye, Atlanta, GA (US)

(73) Assignee: Emory University, Atlanta, GA (US)

( * ) Notice: Subject to any disclaimer, the term of this patent is extended or adjusted under 35 U.S.C. 154(b) by 482 days.

(21) Appl. No.: 17/794,323

(22) PCT Filed: Jan. 21, 2021

(86) PCT No.: PCT/US2021/014418
§ 371 (c)(1),
(2) Date: Jul. 21, 2022

(87) PCT Pub. No.: WO2021/150756
PCT Pub. Date: Jul. 29, 2021

(65) Prior Publication Data
US 2023/0046317 A1 Feb. 16, 2023

Related U.S. Application Data

(60) Provisional application No. 62/964,013, filed on Jan. 21, 2020.

(51) Int. Cl.
*A61K 31/427* (2006.01)
*A61K 31/198* (2006.01)
*A61K 31/337* (2006.01)
*A61K 31/4745* (2006.01)
*A61K 31/4985* (2006.01)
*A61K 31/506* (2006.01)
*A61K 31/519* (2006.01)
*A61K 31/5377* (2006.01)
*A61K 31/58* (2006.01)
*A61K 31/704* (2006.01)
*A61K 38/17* (2006.01)
*A61P 35/00* (2006.01)

(52) U.S. Cl.
CPC .......... *A61K 31/427* (2013.01); *A61K 31/198* (2013.01); *A61K 31/337* (2013.01); *A61K 31/4745* (2013.01); *A61K 31/4985* (2013.01); *A61K 31/506* (2013.01); *A61K 31/519* (2013.01); *A61K 31/5377* (2013.01); *A61K 31/58* (2013.01); *A61K 31/704* (2013.01); *A61K 38/179* (2013.01); *A61P 35/00* (2018.01)

(58) Field of Classification Search
CPC ..... A61P 35/00; A61K 31/427; A61K 31/198; A61K 31/337; A61K 31/4745; A61K 31/4985; A61K 31/506; A61K 31/519; A61K 31/5377; A61K 31/58; A61K 31/704; A61K 38/179
See application file for complete search history.

(56) References Cited

U.S. PATENT DOCUMENTS

| 5,849,769 A | 12/1998 | Lind |
| 7,037,929 B1 * | 5/2006 | Pevarello ............... A61P 37/00 514/371 |
| 2013/0079321 A1 | 3/2013 | Hodges |

FOREIGN PATENT DOCUMENTS

| WO | WO-2004041813 A1 * | 5/2004 | .......... C07D 409/04 |
| WO | 2011137219 | 11/2011 | |
| WO | 2012058176 | 5/2012 | |
| WO | 2014062511 | 4/2014 | |
| WO | WO-2017027984 A1 * | 2/2017 | .......... A61K 31/426 |

OTHER PUBLICATIONS

Nepali, Kunal, Hsueh-Yun Lee, and Jing-Ping Liou. "Nitro-group-containing drugs." Journal of medicinal chemistry 62, No. 6 (2018): 2851-2893 (Year: 2018).*
Checa-Rojas et al. GSTM3 and GSTP1: novel players driving tumor progression in cervical cancer, Oncotarget, 2018, vol. 9, (No. 31), pp. 21696-21714.
Crank et al. Derivatives of 2-Aminooxazoles Showing Antiinflammatory Activity, Journal of Medicinal Chemistry, 1971, vol. 14, No. 11 1075.
Cruz et al. Synthesis and Antitumor Activity of Selenium-Containing Quinone-based Triazoles Possessing Two Redox Centres, and their Mechanistic Insights, Eur J Med Chem. 2016, 122: 1-16.
Fujitani et al. Silencing of Glutathione S-Transferase Pi Inhibits Cancer Cell Growth via Oxidative Stress Induced by Mitochondria Dysfunction, Scientific Reports (2019) 9:14764.
(Continued)

*Primary Examiner* — James H Alstrum-Acevedo
*Assistant Examiner* — Carolyn L. Ladd
(74) *Attorney, Agent, or Firm* — Emory Patent Group

(57) ABSTRACT

This disclosure relates to compounds that inhibit glutathione S-transferases (GSTs) and/or NAD(P)H:quinone oxidoreductase 1 (NQO1) for uses in treating cancer. In certain embodiments, this disclosure relates to compositions and uses of N-(thia-zol-2-yl)-carboxamide derivatives such as a N-(5-nitrothiazol-2-yl)-carboxamide derivatives for treating cancer such as glioblastoma. In certain embodiments, this disclosure relates to pharmaceutical compositions comprising a N-(thiazol-2-yl)-carboxamide derivative such as a N-(5-nitrothiazol-2-yl)-carboxamide derivative which is a compound of formula (I), or derivative, prodrug or salt thereof and a pharmaceutically acceptable excipient, wherein X, $R^1$, $R^2$, and $R^3$ substituents are reported herein.

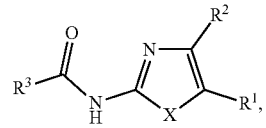

Formula (I)

19 Claims, 10 Drawing Sheets

(56) References Cited

OTHER PUBLICATIONS

Husain et al. Search for Potent Anthelmintics—Part XIII 2-(3,5-Substituted Salicylamido/Cinnomido)-4,5-Sustituted Thiazoles, J Indian Chem Soc, 1979, vol. LVI, 1979, 917-918.

Kadela-Tomanek et al. Betulin-1,4-quinone hybrids: Synthesis, anticancer activity and molecular docking study with NQO1 enzyme, European Journal of Medicinal Chemistry 177 (2019) 302-315.

Ling et al. Development of novel amino-quinoline-5,8-dione derivatives as NAD(P)H:quinone oxidoreductase 1 (NQO1) inhibitors with potent antiproliferative activities, European Journal of Medicinal Chemistry 154 (2018) 199-209.

Praveena et al. Synthesis characterization and antimicrobial activity of 6-nitro-1H-benzo[d] oxazol /thiazol-2-yl)methyl)-6-oxido-4,8-dihydro-1H-[1,3,2]dioxaphosphepino [5,6-c]pyrazole-6-yl)ureas/ carboxamides, Der Pharma Chemica, 2013, 5(4):58-70.

Rasheed et al. Sulphuric acid immobilized on silica gel (H2SO4—SiO2) as an eco-friendly catalyst for transamidation, RSC Adv., 2015, 5, 10567.

Rostamnia et al. Covalently bonded zwitterionic sulfamic acid onto the SBA-15(SBA-15/PrEn-NHSO3H) reveals good Bronsted acidity behavior andcatalytic activity in N-formylation of amines, Journal of Molecular Catalysis A: Chemical 411 (2016) 317-324.

Wu et al. Human glutathione S-transferase P1-1 interacts with TRAF2and regulates TRAF2-ASK1 signals, Oncogene (2006) 25, 5787-5800.

* cited by examiner

MNPC

IC50: 1.32 μM

| Compound | Structure | IC50 (μM) U87MG/ EGFRvIII | IC50 (μM) U87MG |
|---|---|---|---|
| 21 |  | 1.67 | 16.6 |
| 22 |  | 2.42 | 11.2 |
| 23 |  | 2.22 | 29.1 |
| 24 |  | 1.34 | 24.5 |
| 25 |  | 3.34 | 12.3 |
| 26 |  | 21.78 | 49.1 |

| Compound | Structure | IC50 (μM) U87MG/ EGFRvIII | IC50 (μM) U87MG |
|---|---|---|---|
| 20 |  | 1.42 | 18.94 |
| 13 |  | 1.55 | 13.32 |
| 11 |  | 1.89 | 17.11 |
| 12 |  | 2.37 | 21.14 |
| 14 |  | 2.61 | 19.83 |

| Compound | Structure | IC50(μM) U87MG/ EGFRvIII | IC50 (μM) U87MG |
|---|---|---|---|
| 19 | | 3.03 | 35.41 |
| 1 | | 3.59 | 33.12 |
| 2 | | 4.81 | 36.81 |
| 16 | | 4.83 | 25.12 |
| 18 | | 5.03 | 39.16 |

FIG. 1E

| Compound | Structure | IC50(μM) U87MG/ EGFRvIII | IC50 (μM) U87MG |
|---|---|---|---|
| 7 | | 4.81 | 25.11 |
| 8 | | 5.35 | 19.98 |
| 6 | | 5.79 | 23.12 |
| 10 | | 7.14 | 26.81 |
| 9 | | 7.23 | 25.17 |

FIG. 1F

| Compound | Structure | IC50(μM) U87MG/ EGFRvIII | IC50 (μM) U87MG |
|---|---|---|---|
| 17 |  | 3.61 | 15.33 |
| 15 |  | 6.22 | 27.64 |
| 3 |  | 6.98 | 31.74 |
| 4 |  | 7.18 | 25.31 |
| 5 |  | 8.11 | 31.15 |

U87MG IC50: 66.7 μM

U87MG/EGFRvIII IC50: 19.4 μM

TIZ

U87MG IC50: 82.9 μM

U87MG/EGFRvIII IC50: 22.4 μM

FIG. 4A                    FIG. 4B

INHIBITORS OF GLUTATHIONE S-TRANSFERASES (GSTS) AND NAD(P)H:QUINONE OXIDOREDUCTASE 1 (NQO1), PHARMACEUTICAL COMPOSITIONS, AND USES IN MANAGING CANCER

CROSS-REFERENCE TO RELATED APPLICATIONS

This application is the National Stage of International Application No. PCT/US2021/014418 filed Jan. 21, 2021, which claims the benefit of U.S. Provisional Application No. 62/964,013 filed Jan. 21, 2020. The entirety of each of these applications is hereby incorporated by reference for all purposes.

STATEMENT REGARDING FEDERALLY FUNDED RESEARCH

This invention was made with government support under CA186918 awarded by the National Institutes of Health. The government has certain rights in the invention.

BACKGROUND

Glioblastoma multiforme (GBM) is one of the most aggressive and malignant human brain tumors. The available therapies including surgical operation, radiation, and chemotherapy are challenging because the glioblastoma tumors do not have clear borders with tendrils that extend into nearby brain tissue. One of the most selective genetic alterations in GBM is the amplification of epidermal growth factor receptor (EGFR) gene. The most common mutated form lacks exons known as EGFRvIII. Antibodies therapeutics which target the transmembrane protein epidermal growth factor receptor (EGFR) have been investigated. However, this therapeutic method has limited efficacy. For example, the phosphatase and tension homolog (PTEN) enzyme acts as a tumor suppressor. Patients with EGFR-driven tumors that carry PTEN mutations do not respond to anti-EGFR therapy. Thus, there is a need to identify improved therapeutics for treating GBM.

Glutathione S-transferases (GSTs) are divided into six classes. Glutathione S-transferase Pi (GSTπ, GSTP1-1, GSTP1) is the most prevalent isozyme in mammals. GSTP1 has been reported as being dysregulated in cancers such as: prostate cancer, triple-negative breast cancer, lung cancer, colorectal cancer, and cervical cancer. Checa-Rojas et al. Oncotarget, 2018, 9 (31): 21696-21714. Fujitani et al. report silencing of glutathione S-transferase pi inhibits cancer cell growth via oxidative stress induced by mitochondria dysfunction. Sci Rep. 2019, 9(1):14764.

Ling et al. report NAD(P)H:quinone oxidoreductase 1 (NQO1) inhibitors with potent antiproliferative activities. European Journal of Medicinal Chemistry, 2018, 154:199-209.

References cited herein are not an admission of prior art.

SUMMARY

This disclosure relates to compounds that inhibit glutathione S-transferases (GSTs) and/or NAD(P)H:quinone oxidoreductase 1 (NQO1) for uses in treating cancer. In certain embodiments, this disclosure relates to compositions and uses of N-(thiazol-2-yl)-carboxamide derivatives such as a N-(5-nitrothiazol-2-yl)-carboxamide derivatives for treating cancer such as glioblastoma. In certain embodiments, this disclosure relates to pharmaceutical compositions comprising a N-(thiazol-2-yl)-carboxamide derivative such as a N-(5-nitrothiazol-2-yl)-carboxamide derivative which is a compound of formula I,

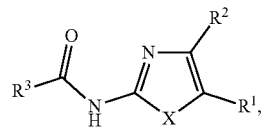

formula I derivative, prodrug, or salt thereof and a pharmaceutically acceptable excipient, wherein X, $R^1$, $R^2$, and $R^3$ substituents are reported herein.

In certain embodiments, the pharmaceutically acceptable excipient is selected from a saccharide, disaccharide, sucrose, lactose, glucose, mannitol, sorbitol, polysaccharides, starch, cellulose, microcrystalline cellulose, cellulose ether, hydroxypropyl cellulose (HPC), xylitol, sorbitol, maltitol, gelatin, polyvinylpyrrolidone (PVP), polyethylene glycol (PEG), hydroxypropyl methylcellulose (HPMC), crosslinked sodium carboxymethyl cellulose, dibasic calcium phosphate, calcium carbonate, stearic acid, magnesium stearate, talc, magnesium carbonate, silica, vitamin A, vitamin E, vitamin C, retinyl palmitate, selenium, cysteine, methionine, citric acid, sodium citrate, methyl paraben, propyl paraben, and combinations thereof.

In certain embodiments, the pharmaceutical composition is in the form of a tablet, pill, capsule, gel, gel capsule, or cream. In certain embodiments, the pharmaceutical composition is in the form of a sterilized pH buffered aqueous salt solution or a saline phosphate buffer between a pH of 6 to 8, optionally comprising a saccharide or polysaccharide.

In certain embodiments, the pharmaceutical composition is in solid form surrounded by an enteric coating. In certain embodiments, the enteric coatings comprises a component such as methyl acrylate-methacrylic acid copolymers, cellulose acetate phthalate (CAP), cellulose acetate succinate, hypromellose (hydroxypropyl methylcellulose), hypromellose phthalate (hydroxypropyl methyl cellulose phthalate), hypromellose acetate succinate (hydroxypropyl methyl cellulose acetate succinate), diethyl phthalate, polyvinyl acetate phthalate (PVAP), methyl methacrylate-methacrylic acid copolymers, or combinations thereof.

In certain embodiments, the pharmaceutically acceptable excipient is selected from lactose, sucrose, mannitol, triethyl citrate, dextrose, cellulose, microcrystalline cellulose, methyl cellulose, ethyl cellulose, hydroxyl propyl cellulose, hydroxypropyl methylcellulose, carboxymethylcellulose, croscarmellose sodium, polyvinyl N-pyrrolidone (crospovidone), ethyl cellulose, povidone, methyl and ethyl acrylate copolymer, polyethylene glycol, fatty acid esters of sorbitol, lauryl sulfate, gelatin, glycerin, glyceryl monooleate, silicon dioxide, titanium dioxide, talc, corn starch, carnauba wax, stearic acid, sorbic acid, magnesium stearate, calcium stearate, castor oil, mineral oil, calcium phosphate, starch, carboxymethyl ether of starch, iron oxide, triacetin, acacia gum, esters, or salts thereof.

In certain embodiments, this disclosure relates to methods of treating cancer comprising administering an effective amount of pharmaceutical composition comprising a compound of formula I or formula IA-G as reported herein to a subject in need thereof. In certain embodiments, the subject is at risk of, exhibiting symptoms of, or diagnosed with cancer or glioblastoma. In certain embodiments, the subject is at risk of, exhibiting symptoms of, or diagnosed with breast cancer, cervical cancer, prostate cancer, colorectal cancer, gastric cancer, lung cancer, skin cancer, bladder cancer, brain cancer, kidney cancer, endometrial cancer, pancreatic cancer, or thyroid cancer.

In certain embodiments, a second anti-cancer agent is administered in combination with N-(thiazol-2-yl)-carboxamide derivatives such as a N-(5-nitrothiazol-2-yl)-carboxamide derivatives or a compound of formula I or formula IA-G as reported herein. In certain embodiments, the second anti-cancer agent is abemaciclib, abiraterone acetate, methotrexate, paclitaxel, adriamycin, acalabrutinib, brentuximab vedotin, ado-trastuzumab emtansine, aflibercept, afatinib, netupitant, palonosetron, imiquimod, aldesleukin, alectinib, alemtuzumab, pemetrexed disodium, copanlisib, melphalan, brigatinib, chlorambucil, amifostine, aminolevulinic acid, anastrozole, apalutamide, aprepitant, pamidronate disodium, exemestane, nelarabine, arsenic trioxide, ofatumumab, atezolizumab, bevacizumab, avelumab, axicabtagene ciloleucel, axitinib, azacitidine, carmustine, belinostat, bendamustine, inotuzumab ozogamicin, bevacizumab, bexarotene, bicalutamide, bleomycin, blinatumomab, bortezomib, bosutinib, brentuximab vedotin, brigatinib, busulfan, irinotecan, capecitabine, fluorouracil, carboplatin, carfilzomib, ceritinib, daunorubicin, cetuximab, cisplatin, cladribine, cyclophosphamide, clofarabine, cobimetinib, cabozantinib-S-malate, dactinomycin, crizotinib, ifosfamide, ramucirumab, cytarabine, dabrafenib, dacarbazine, decitabine, daratumumab, dasatinib, defibrotide, degarelix, denileukin diftitox, denosumab, dexamethasone, dexrazoxane, dinutuximab, docetaxel, doxorubicin, durvalumab, rasburicase, epirubicin, elotuzumab, oxaliplatin, eltrombopag olamine, enasidenib, enzalutamide, eribulin, vismodegib, erlotinib, etoposide, everolimus, raloxifene, toremifene, panobinostat, fulvestrant, letrozole, filgrastim, fludarabine, flutamide, pralatrexate, obinutuzumab, gefitinib, gemcitabine, gemtuzumab ozogamicin, glucarpidase, goserelin, propranolol, trastuzumab, topotecan, palbociclib, ibritumomab tiuxetan, ibrutinib, ponatinib, idarubicin, idelalisib, imatinib, talimogene laherparepvec, ipilimumab, romidepsin, ixabepilone, ixazomib, ruxolitinib, cabazitaxel, palifermin, pembrolizumab, ribociclib, tisagenlecleucel, lanreotide, lapatinib, olaratumab, lenalidomide, lenvatinib, leucovorin, leuprolide, lomustine, trifluridine, olaparib, vincristine, procarbazine, mechlorethamine, megestrol, trametinib, temozolomide, methylnaltrexone bromide, midostaurin, mitomycin C, mitoxantrone, plerixafor, vinorelbine, necitumumab, neratinib, sorafenib, nilutamide, nilotinib, niraparib, nivolumab, tamoxifen, romiplostim, sonidegib, omacetaxine, pegaspargase, ondansetron, osimertinib, panitumumab, pazopanib, interferon alfa-2b, pertuzumab, pomalidomide, mercaptopurine, regorafenib, rituximab, rolapitant, rucaparib, siltuximab, sunitinib, thioguanine, temsirolimus, thalidomide, thiotepa, trabectedin, valrubicin, vandetanib, vinblastine, vemurafenib, vorinostat, zoledronic acid, or combinations thereof.

In certain embodiments, this disclosure contemplates a N-(thiazol-2-yl)-carboxamide derivative such as a N-(5-nitrothiazol-2-yl)-carboxamide derivative disclosed herein for use as a medicament or in the production of a medicament. In certain embodiments, this disclosure contemplates the use of a N-(thiazol-2-yl)-carboxamide derivative such as a N-(5-nitrothiazol-2-yl)-carboxamide derivative or pharmaceutical composition disclosed herein for the treatment of cancer such as brain cancer, e.g., use of a N-(thiazol-2-yl)-carboxamide derivative such as a N-(5-nitrothiazol-2-yl)-carboxamide derivative for the manufacture of a medicament for treating cancer.

BRIEF DESCRIPTION OF THE SEVERAL VIEWS OF THE DRAWING(S)

FIG. 1E shows structures and $IC_{50}$ of inhibition activity of compound derivatives in U87MG/EGFRvIII and U87MG cells.

FIG. 1F shows structures and $IC_{50}$ of inhibition activity of compound derivatives in U87MG/EGFRvIII and U87MG cells.

Figure 3A:
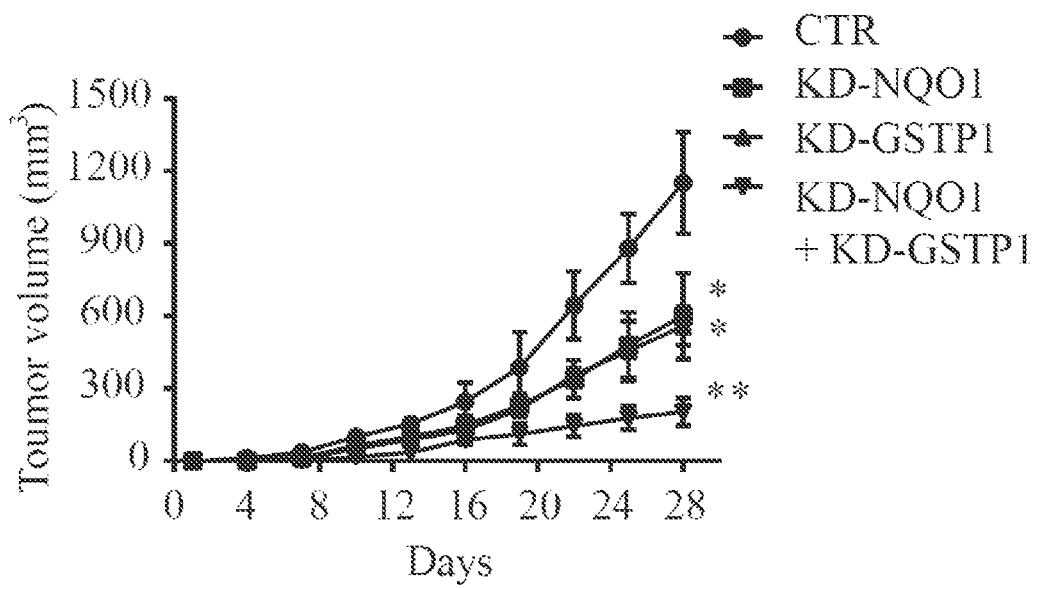

FIG. 3A shows data on the anti-cancer effect of depleting NQO1 and GSTP1 in nude mice model. U87MG/EGFRvIII cells were stably knocked down with NQO1, GSTP1 or both. Tumor growth suppression by depletion of both NQO1 and GSTP1 in nude mice. Tumor growth suppression in nude mice by both depletion of NQO1 and GSTP1.

Figure 3B:
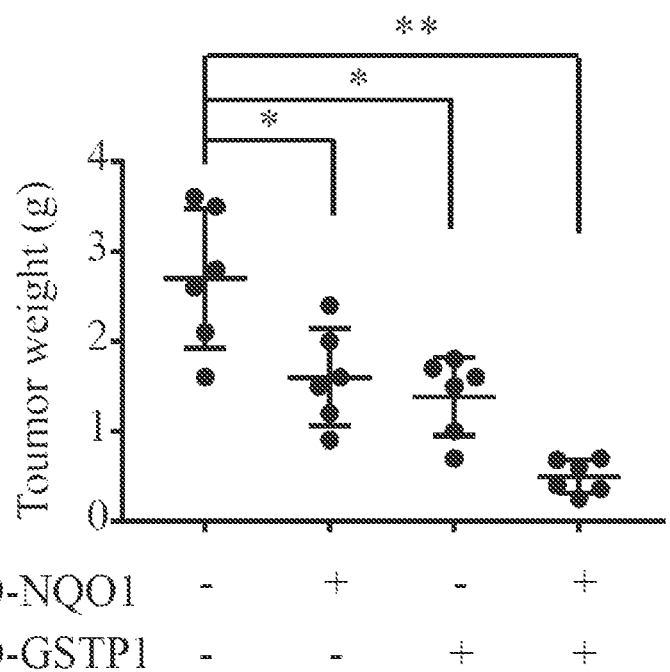

FIG. 3B shows data on tumor weight of the mice at the endpoint.

FIG. 4A shows data indicating MNPC suppresses tumor growth of U87MG/EGFRVIII cells in the brain and elongates mouse life span. Nu/Nu nude mice were treated with increasing doses (3, 10 mg/kg) of MNPC by i.p. every two days for total 10 times (n=6 mice per group). The survival curves of brain tumor-bearing mice were calculated.

FIG. 4B shows weight of intracranial model mice treated with MNPC (3, 10 mg/kg) or control vehicle.

Figure 4C:
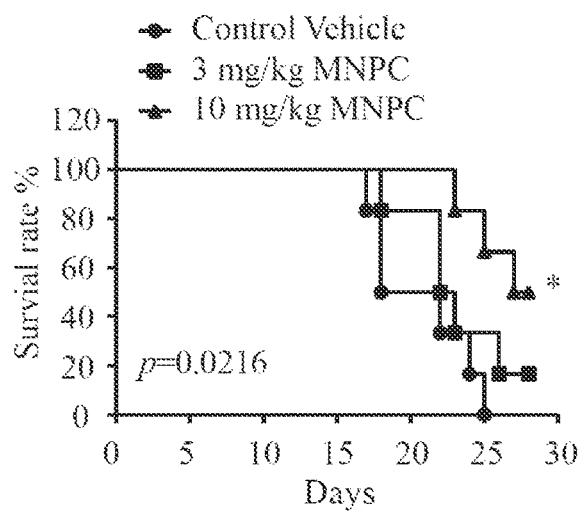
Figure 4C:
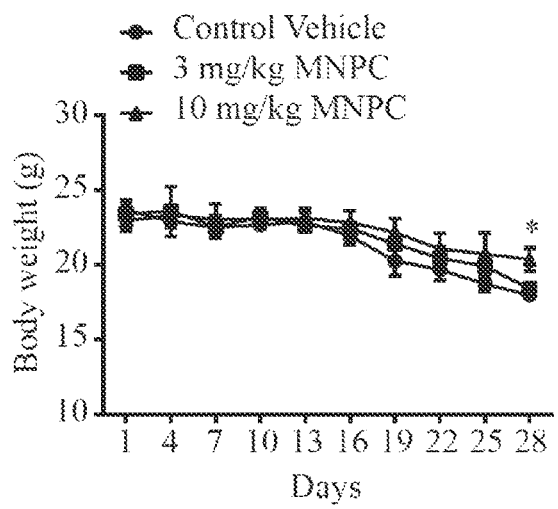
Figure 4C:
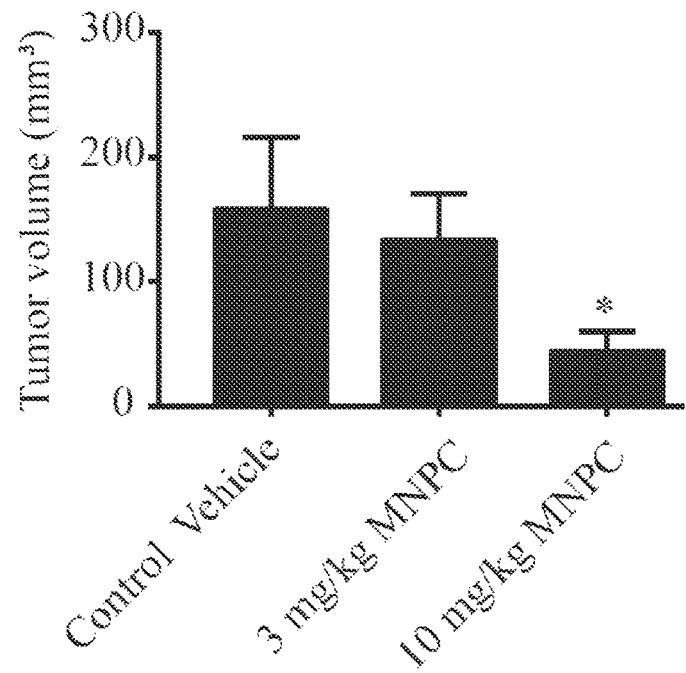

FIG. 4C shows quantitative analysis of intracranial tumor volume in the mice treated with MNPC (3, 10 mg/kg) or control vehicle.

DETAILED DISCUSSION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of medicine, organic chemistry, biochemistry, molecular biology, pharmacology, and the like, which are within the skill of the art. Such techniques are explained fully in the literature.

It must be noted that, as used in the specification and the appended claims, the singular forms "a," "an," and "the" include plural referents unless the context clearly dictates otherwise. In this specification and in the claims that follow, reference will be made to a number of terms that shall be defined to have the following meanings unless a contrary intention is apparent.

"Subject" refers to any animal, preferably a human patient, livestock, rodent, monkey or domestic pet.

"Cancer" refers any of various cellular diseases with malignant neoplasms characterized by the proliferation of cells. It is not intended that the diseased cells must actually invade surrounding tissue and metastasize to new body sites. Cancer can involve any tissue of the body and have many different forms in each body area. Within the context of certain embodiments, whether "cancer is reduced" may be identified by a variety of diagnostic manners known to one skill in the art including, but not limited to, observation the reduction in size or number of tumor masses or if an increase of apoptosis of cancer cells observed, e.g., if more than a 5% increase in apoptosis of cancer cells is observed for a sample compound compared to a control without the compound. It may also be identified by a change in relevant biomarker or gene expression profile, such as PSA for prostate cancer, HER2 for breast cancer, or others.

A "chemotherapy agent," "chemotherapeutic," "anti-cancer agent" or the like, refer to molecules that are recognized to aid in the treatment of a cancer. Contemplated examples include the following molecules or derivatives such as temozolomide, carmustine, bevacizumab, procarbazine, lomustine, vincristine, gefitinib, erlotinib, cisplatin, carboplatin, oxaliplatin, 5-fluorouracil, gemcitabine, tegafur, raltitrexed, methotrexate, cytosine arabinoside, hydroxyurea, adriamycin, bleomycin, doxorubicin, daunomycin, epirubicin, idarubicin, mitomycin-C, dactinomycin, mithramycin, vinblastine, vindesine, vinorelbine, paclitaxel, taxol, docetaxel, etoposide, teniposide, amsacrine, topotecan, camptothecin, bortezomib, anagrelide, tamoxifen, toremifene, raloxifene, droloxifene, fulvestrant, bicalutamide, flutamide, nilutamide, goserelin, leuprorelin, buserelin, megestrol, anastrozole, letrozole, vorozole, exemestane, finasteride, marimastat, trastuzumab, cetuximab, dasatinib, imatinib, thalidomide, azacitidine, azathioprine, capecitabine, chlorambucil, cyclophosphamide, cytarabine, daunorubicin, doxifluridine, epothilone D, irinotecan, mechlorethamine, mercaptopurine, mitoxantrone, pemetrexed, tioguanine, valrubicin and/or lenalidomide or combinations thereof such as cyclophosphamide, methotrexate, 5-fluorouracil (CMF); doxorubicin, cyclophosphamide (AC); mustine, vincristine, procarbazine, prednisolone (MOPP); adriamycin, bleomycin, vinblastine, dacarbazine (ABVD); cyclophosphamide, doxorubicin, vincristine, prednisolone (CHOP); bleomycin, etoposide, cisplatin (BEP); epirubicin, cisplatin, 5-fluorouracil (ECF); epirubicin, cisplatin, capecitabine (ECX); methotrexate, vincristine, doxorubicin, cisplatin (MVAC).

As used herein, the terms "treat" and "treating" are not limited to the case where the subject (e.g., patient) is cured and the disease is eradicated. Rather, embodiments, of the present disclosure also contemplate treatment that merely reduces symptoms, and/or delays disease progression.

As used herein, the term "combination with" when used to describe administration with an additional treatment means that the agent may be administered prior to, together with, or after the additional treatment, or a combination thereof.

The term "effective amount" refers to that amount of a compound or pharmaceutical composition described herein that is sufficient to effect the intended application including, but not limited to, disease treatment, as illustrated below. The therapeutically effective amount can vary depending upon the intended application (in vitro or in vivo), or the subject and disease condition being treated, e.g., the weight and age of the subject, the severity of the disease condition, the manner of administration and the like, which can readily be determined by one of ordinary skill in the art. The specific dose will vary depending on, for example, the particular compounds chosen, the dosing regimen to be followed, whether it is administered in combination with other agents, timing of administration, the tissue to which it is administered, and the physical delivery system in which it is carried.

As used herein, the term "derivative" refers to a structurally similar compound that retains sufficient functional attributes of the identified analogue. The derivative may be structurally similar because it is lacking one or more atoms, substituted, a salt, in different hydration/oxidation states, or because one or more atoms within the molecule are switched, such as, but not limited to, replacing an oxygen atom with a sulfur atom or replacing an amino group with a hydroxy group. A derivative may be a prodrug. Contemplated derivatives include switching carbocyclic, aromatic or phenyl rings with heterocyclic rings or switching heterocyclic rings with carbocyclic, aromatic or phenyl rings, typically of the same ring size. Derivatives may be prepared by any variety of synthetic methods or appropriate adaptations presented in synthetic or organic chemistry text books, such as those provide in March's Advanced Organic Chemistry: Reactions, Mechanisms, and Structure, Wiley, 6th Edition (2007) Michael B. Smith or Domino Reactions in Organic Synthesis, Wiley (2006) Lutz F. Tietze, all hereby incorporated by reference.

The term "substituted" refers to a molecule wherein at least one hydrogen atom is replaced with a substituent. When substituted, one or more of the groups are "substituents." The molecule may be multiply substituted. In the case of an oxo substituent ("=O"), two hydrogen atoms are replaced. Example substituents within this context may include halogen, hydroxy, alkyl, alkoxy, nitro, cyano, oxo, carbocyclyl, carbocycloalkyl, heterocarbocyclyl, heterocarbocycloalkyl, aryl, arylalkyl, heteroaryl, heteroarylalkyl, —NRaRb, —NRaC(=O)Rb, —NRaC(=O)NRaNRb, —NRaC(═O)ORb, —NRaSO₂Rb, —C(═O)Ra, —C(═O)ORa, —C(═O)NRaRb, —OC(═O)NRaRb, —ORa, —SRa, —SORa, —S(═O)₂Ra, —OS(═O)₂Ra and —S(═O)₂ORa. Ra and Rb in this context may be the same or different and independently hydrogen, halogen hydroxy, alkyl, alkoxy, alkyl, amino, alkylamino, dialkylamino, carbocyclyl, carbocycloalkyl, heterocarbocyclyl, heterocarbocycloalkyl, aryl, arylalkyl, heteroaryl, heteroarylalkyl.

As used herein, "alkyl" means a noncyclic straight chain or branched, unsaturated or saturated hydrocarbon such as those containing from 1 to 10 carbon atoms. Representative saturated straight chain alkyls include methyl, ethyl, n-propyl, n-butyl, n-pentyl, n-hexyl, n-septyl, n-octyl, n-nonyl, and the like; while saturated branched alkyls include isopropyl, sec-butyl, isobutyl, tert-butyl, isopentyl, and the like. Unsaturated alkyls contain at least one double or triple bond between adjacent carbon atoms (referred to as an "alkenyl" or "alkynyl", respectively).

Representative straight chain and branched alkenyls include ethylenyl, propylenyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, and the like; while representative straight chain and branched alkynyls include acetylenyl, propynyl, 1-butynyl, 2-butynyl, 1-pentynyl, 2-pentynyl, 3-methyl-1-butynyl, and the like.

Non-aromatic mono or polycyclic alkyls are referred to herein as "carbocycles" or "carbocyclyl" groups. Representative saturated carbocycles include cyclopropyl, cyclobutyl, cyclopentyl, cyclohexyl, and the like; while unsaturated carbocycles include cyclopentenyl and cyclohexenyl, and the like.

"Heterocarbocycles" or heterocarbocyclyl" groups are carbocycles which contain from 1 to 4 heteroatoms independently selected from nitrogen, oxygen and sulfur which may be saturated or unsaturated (but not aromatic), monocyclic or polycyclic, and wherein the nitrogen and sulfur heteroatoms may be optionally oxidized, and the nitrogen heteroatom may be optionally quaternized. Heterocarbocycles include morpholinyl, pyrrolidinonyl, pyrrolidinyl, piperidinyl, hydantoinyl, valerolactamyl, oxiranyl, oxetanyl, tetrahydrofuranyl, tetrahydropyranyl, tetrahydropyridinyl, tetrahydroprimidinyl, tetrahydrothiophenyl, tetrahydrothiopyranyl, tetrahydropyrimidinyl, tetrahydrothiophenyl, tetrahydrothiopyranyl, and the like.

"Aryl" means an aromatic carbocyclic monocyclic or polycyclic ring such as phenyl or naphthyl. Polycyclic ring systems may, but are not required to, contain one or more non-aromatic rings, as long as one of the rings is aromatic.

As used herein, "heteroaryl" or "heteroaromatic" refers an aromatic heterocarbocycle having 1 to 4 heteroatoms selected from nitrogen, oxygen and sulfur, and containing at least 1 carbon atom, including both mono- and polycyclic ring systems. Polycyclic ring systems may, but are not required to, contain one or more non-aromatic rings, as long as one of the rings is aromatic. Representative heteroaryls are furyl, benzofuranyl, thiophenyl, benzothiophenyl, pyrrolyl, indolyl, isoindolyl, azaindolyl, pyridyl, quinolinyl, isoquinolinyl, oxazolyl, isooxazolyl, benzoxazolyl, pyrazolyl, imidazolyl, benzimidazolyl, thiazolyl, benzothiazolyl, isothiazolyl, pyridazinyl, pyrimidinyl, pyrazinyl, triazinyl, cinnolinyl, phthalazinyl, and quinazolinyl. It is contemplated that the use of the term "heteroaryl" includes N-alkylated derivatives such as a 1-methylimidazol-5-yl substituent.

As used herein, "heterocycle" or "heterocyclyl" refers to mono- and polycyclic ring systems having 1 to 4 heteroatoms selected from nitrogen, oxygen and sulfur, and containing at least 1 carbon atom. The mono- and polycyclic ring systems may be aromatic, non-aromatic or mixtures of aromatic and non-aromatic rings. Heterocycle includes heterocarbocycles, heteroaryls, and the like.

"Alkylthio" refers to an alkyl group as defined above attached through a sulfur bridge. An example of an alkylthio is methylthio, (i.e., —S—CH₃).

"Alkoxy" refers to an alkyl group as defined above attached through an oxygen bridge. Examples of alkoxy include, but are not limited to, methoxy, ethoxy, n-propoxy, i-propoxy, n-butoxy, s-butoxy, t-butoxy, n-pentoxy, and s-pentoxy. Preferred alkoxy groups are methoxy, ethoxy, n-propoxy, i-propoxy, n-butoxy, s-butoxy, t-butoxy.

"Alkylamino" refers an alkyl group as defined above attached through an amino bridge. An example of an alkylamino is methylamino, (i.e., —NH—CH₃).

"Alkanoyl" refers to an alkyl as defined above attached through a carbonyl bridge (i.e., —(C═O)alkyl).

"Alkylsulfonyl" refers to an alkyl as defined above attached through a sulfonyl bridge (i.e., —S(═O)₂alkyl) such as mesyl and the like, and "Arylsulfonyl" refers to an aryl attached through a sulfonyl bridge (i.e., —S(═O)₂aryl).

"Alkylsulfinyl" refers to an alkyl as defined above with the indicated number of carbon atoms attached through a sulfinyl bridge (i.e. —S(═O)alkyl).

The terms "halogen" and "halo" refer to fluorine, chlorine, bromine, and iodine.

The term "sulfamoyl" refers to the amide of sulfonic acid (i.e., —S(═O)₂NRR')

An unspecified "R" group may be a hydrogen, lower alkyl, aryl, or heteroaryl, which may be optionally substituted with one or more, the same or different, substituents.

Throughout the specification, groups and substituents thereof may be chosen to provide stable moieties and compounds.

N-(Thiazol-2-yl)-Carboxamide Derivatives

This disclosure relates to compositions of N-(thiazol-2-yl)-carboxamide derivatives such as N-(5-nitrothiazol-2-yl)-carboxamide derivatives. Example N-(5-nitrothiazol-2-yl)-carboxamide derivatives include 5-methyl-N-(5-nitrothiazol-2-yl)-3-phenylisoxazole-4-carboxamide, nitazoxanide, 2-((5-nitrothiazol-2-yl)carbamoyl)phenyl acetate (NTZ) and tizoxanide 2-hydroxy-N-(5-nitrothiazol-2-yl)benzamide (TIZ) or salts thereof.

In certain embodiments, the N-(thiazol-2-yl)-carboxamide derivative is a compound of formula I,

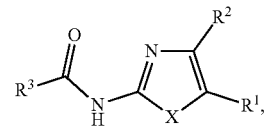

formula I prodrug or salt thereof and a pharmaceutically acceptable excipient, wherein X is S or O;

$R^1$ is selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^1$ is optionally substituted with one or more, the same or different, $R^{10}$;

$R^2$ is selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^2$ is optionally substituted with one or more, the same or different, $R^{10}$;

$R^3$ is selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^3$ is optionally substituted with one or more, the same or different, $R^{10}$;

$R^{10}$ is selected from alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^{10}$ is optionally substituted with one or more, the same or different, $R^{11}$, and $R^{11}$ is selected from halogen, nitro, cyano, hydroxy, trifluoromethoxy, trifluoromethyl, amino, formyl, carboxy, carbamoyl, mercapto, sulfamoyl, methyl, ethyl, propyl, tert-butyl, methoxy, ethoxy, acetyl, acetoxy, methylamino, ethylamino, dimethylamino, diethylamino, N-methyl-N-ethylamino, acetylamino, N-methylcarbamoyl, N-ethylcarbamoyl, N,N-dimethylcarbamoyl, N,N-diethylcarbamoyl, N-methyl-N-ethylcarbamoyl, methylthio, ethylthio, methylsulfinyl, ethylsulfinyl, mesyl, ethylsulfonyl, methoxycarbonyl, ethoxycarbonyl, N-methylsulfamoyl, N-ethylsulfamoyl, N,N-dimethylsulfamoyl, N,N-diethylsulfamoyl, N-methyl-N-ethylsulfamoyl, carbocyclyl, aryl, and heterocyclyl.

In certain embodiments, $R^1$ is nitro.
In certain embodiments, $R^2$ is hydrogen.
In certain embodiments, $R^3$ is isoxazolyl substituted with one or more $R^{10}$.
In certain embodiments, the $R^3$ is 5-methy-3-phenyl-isoxazolyl.
In certain embodiments, the N-(thiazol-2-yl)-carboxamide derivative is a compound having formula IA,

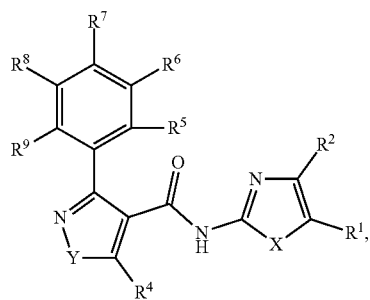

formula IA, prodrug or salt thereof and a pharmaceutically acceptable excipient, wherein X is S or O;
Y is S or O;
$R^1$ is selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^1$ is optionally substituted with one or more, the same or different, $R^{10}$;

$R^2$ is selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^2$ is optionally substituted with one or more, the same or different, $R^{10}$, $R^4$ is selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^4$ is optionally substituted with one or more, the same or different, $R^{10}$, $R^5$, $R^6$, $R^7$, $R^8$, and $R^9$ are individually and independently selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^5$, $R^6$, $R^7$, $R^8$, and $R^9$ are optionally substituted with one or more, the same or different, $R^{10}$, $R^{10}$ is selected from alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^{10}$ is optionally substituted with one or more, the same or different, $R^{11}$, and $R^{11}$ is selected from halogen, nitro, cyano, hydroxy, trifluoromethoxy, trifluoromethyl, amino, formyl, carboxy, carbamoyl, mercapto, sulfamoyl, methyl, ethyl, propyl, tert-butyl, methoxy, ethoxy, acetyl, acetoxy, methylamino, ethylamino, dimethylamino, diethylamino, N-methyl-N-ethylamino, acetylamino, N-methylcarbamoyl, N-ethylcarbamoyl, N,N-dimethylcarbamoyl, N,N-diethylcarbamoyl, N-methyl-N-ethylcarbamoyl, methylthio, ethylthio, methylsulfinyl, ethylsulfinyl, mesyl, ethylsulfonyl, methoxycarbonyl, ethoxycarbonyl, N-methylsulfamoyl, N-ethylsulfamoyl, N,N-dimethylsulfamoyl, N,N-diethylsulfamoyl, N-methyl-N-ethylsulfamoyl, carbocyclyl, aryl, and heterocyclyl.

In certain embodiments, $R^1$ is nitro.
In certain embodiments, $R^4$ is alkyl.
In certain embodiments, the N-(thiazol-2-yl)-carboxamide derivative is a compound having formula IB, formula IB

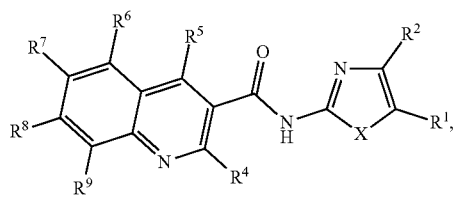

prodrug or salt thereof and a pharmaceutically acceptable excipient, wherein

X is S or O;
$R^1$ is selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^1$ is optionally substituted with one or more, the same or different, $R^{10}$, $R^2$ is selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^2$ is optionally substituted with one or more, the same or different, $R^{10}$;

$R^4$ is selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^4$ is optionally substituted with one or more, the same or different, $R^{10}$;

$R^5$ is selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^5$ is optionally substituted with one or more, the same or different, $R^{10}$;

$R^6$, $R^7$, $R^8$, and $R^9$ are individually and independently selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^6$, $R^7$, $R^8$, and $R^9$ are optionally substituted with one or more, the same or different, $R^{10}$;

$R^{10}$ is selected from alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^{10}$ is optionally substituted with one or more, the same or different, $R^{11}$; and $R^{11}$ is selected from halogen, nitro, cyano, hydroxy, trifluoromethoxy, trifluoromethyl, amino, formyl, carboxy, carbamoyl, mercapto, sulfamoyl, methyl, ethyl, propyl, tert-butyl, methoxy, ethoxy, acetyl, acetoxy, methylamino, ethylamino, dimethylamino, diethylamino, N-methyl-N-ethylamino, acetylamino, N-methylcarbamoyl, N-ethylcarbamoyl, N,N-dimethylcarbamoyl, N,N-diethylcarbamoyl, N-methyl-N-ethylcarbamoyl, methylthio, ethylthio, methylsulfinyl, ethylsulfinyl, mesyl, ethylsulfonyl, methoxycarbonyl, ethoxycarbonyl, N-methylsulfamoyl, N-ethylsulfamoyl, N,N-dimethylsulfamoyl, N,N-diethylsulfamoyl, N-methyl-N-ethylsulfamoyl, carbocyclyl, aryl, and heterocyclyl.

In certain embodiments, the compound is 4-hydroxy-N-(5-nitrothiazol-2-yl) quinoline-3-carboxamide, derivatives, prodrugs, or salts thereof. In certain embodiments, the compound is 8-fluoro-4-hydroxy-N-(5-nitrothiazol-2-yl) quinoline-3-carboxamide, derivatives, prodrugs, or salts thereof. In certain embodiments, the compound is 6-chloro-4-hydroxy-N-(5-nitrothiazol-2-yl) quinoline-3-carboxamide, derivatives, prodrugs, or salts thereof. In certain embodiments, the compound is 4-hydroxy-6-methoxy-N-(5-nitrothiazol-2-yl) quinoline-3-carboxamide, derivatives, prodrugs, or salts thereof. In certain embodiments, the compound is 4-hydroxy-8-methoxy-N-(5-nitrothiazol-2-yl) quinoline-3-carboxamide, derivatives, prodrugs, or salts thereof In certain embodiments, $R^5$ is hydroxy.
In certain embodiments, $R^1$ is nitro.
In certain embodiments, $R^4$ is alkyl.
In certain embodiments, the N-(thiazol-2-yl)-carboxamide derivative is a compound having formula IC,

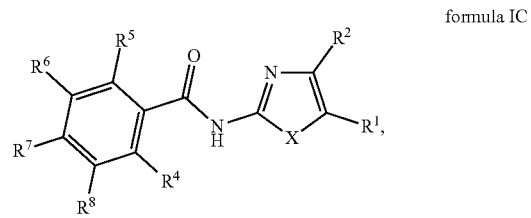

formula IC prodrug or salt thereof and a pharmaceutically acceptable excipient, wherein X is S or O;

$R^1$ is selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^1$ is optionally substituted with one or more, the same or different, $R^{10}$, $R^2$ is selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^2$ is optionally substituted with one or more, the same or different, $R^{10}$, $R^4$, $R^5$, $R^6$, $R^7$, and $R^8$ are individually and independently selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^4$, $R^5$, $R^6$, $R^7$, and $R^8$ are optionally substituted with one or more, the same or different, $R^{10}$;

$R^{10}$ is selected from alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^{10}$ is optionally substituted with one or more, the same or different, $R^{11}$; and $R^{11}$ is selected from halogen, nitro, cyano, hydroxy, trifluoromethoxy, trifluoromethyl, amino, formyl, carboxy, carbamoyl, mercapto, sulfamoyl, methyl, ethyl, propyl, tert-butyl, methoxy, ethoxy, acetyl, acetoxy, methylamino, ethylamino, dimethylamino, diethylamino, N-methyl-N-ethylamino, acetylamino, N-methylcarbamoyl, N-ethylcarbamoyl, N,N-dimethylcarbamoyl, N,N-diethylcarbamoyl, N-methyl-N-ethylcarbamoyl, methylthio, ethylthio, methylsulfinyl, ethylsulfinyl, mesyl, ethylsulfonyl, methoxycarbonyl, ethoxycarbonyl, N-methylsulfamoyl, N-ethylsulfamoyl, N,N-dimethylsulfamoyl, N,N-diethylsulfamoyl, N-methyl-N-ethylsulfamoyl, carbocyclyl, aryl, and heterocyclyl.

In certain embodiments, the compound is 4-methyl-N-(5-methyl-4-phenylthiazol-2-yl)benzamide, derivatives, prodrugs, or salts thereof.

In certain embodiments, R² is phenyl, 2,4-dimethylphenyl, 2,5-dimethylphenyl, or 3,4-dimethylphenyl.

In certain embodiments, R¹ is alkyl.

In certain embodiments, R¹ is nitro.

In certain embodiments, R⁴ is alkyl.

In certain embodiments, R⁷ is phenyl.

In certain embodiments, the N-(thiazol-2-yl)-carboxamide derivative is a compound having formula ID,

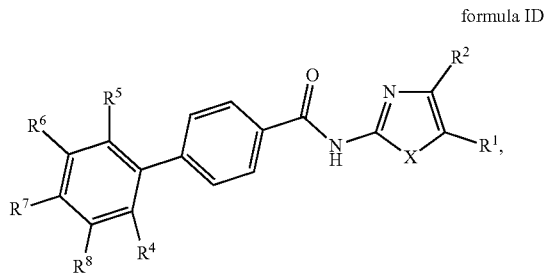

formula ID prodrug or salt thereof and a pharmaceutically acceptable excipient, wherein X is S or O;

R¹ is selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein R¹ is optionally substituted with one or more, the same or different, R¹⁰;

R² is selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein R² is optionally substituted with one or more, the same or different, R¹⁰;

R⁴, R⁵, R⁶, R⁷, and R⁸ are individually and independently selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein R⁴, R⁵, R⁶, R⁷, and R⁸ are optionally substituted with one or more, the same or different, R¹⁰;

R¹⁰ is selected from alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein R¹⁰ is optionally substituted with one or more, the same or different, R¹¹; and R¹¹ is selected from halogen, nitro, cyano, hydroxy, trifluoromethoxy, trifluoromethyl, amino, formyl, carboxy, carbamoyl, mercapto, sulfamoyl, methyl, ethyl, propyl, tert-butyl, methoxy, ethoxy, acetyl, acetoxy, methylamino, ethylamino, dimethylamino, diethylamino, N-methyl-N-ethylamino, acetylamino, N-methylcarbamoyl, N-ethylcarbamoyl, N,N-dimethylcarbamoyl, N,N-diethylcarbamoyl, N-methyl-N-ethylcarbamoyl, methylthio, ethylthio, methylsulfinyl, ethylsulfinyl, mesyl, ethylsulfonyl, methoxycarbonyl, ethoxycarbonyl, N-methylsulfamoyl, N-ethylsulfamoyl, N,N-dimethylsulfamoyl, N,N-diethylsulfamoyl, N-methyl-N-ethylsulfamoyl, carbocyclyl, aryl, and heterocyclyl.

In certain embodiments, the compound is N-(4-phenylthiazol-2-yl)-[1,1'-biphenyl]-4-carboxamide, derivatives, prodrugs, or salts thereof.

In certain embodiments, the compound is N-(4-(2,5-dimethylphenyl) thiazol-2-yl)-[1,1'-biphenyl]-4-carboxamide, derivatives, prodrugs, or salts thereof.

In certain embodiments, R¹ is nitro.

In certain embodiments, R² is phenyl, 2,4-dimethylphenyl, 2,5-dimethylphenyl, or 3,4-dimethylphenyl.

In certain embodiments, R⁴ is alkyl.

In certain embodiments, the N-(thiazol-2-yl)-carboxamide derivative is a compound having formula IE,

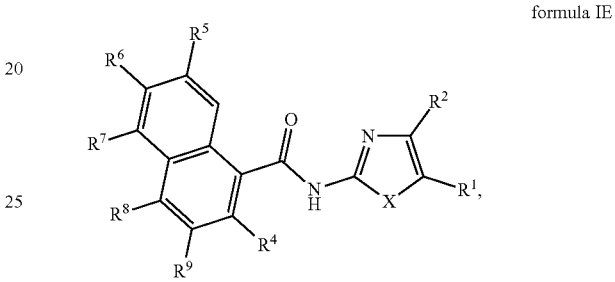

formula IE prodrug or salt thereof and a pharmaceutically acceptable excipient, wherein X is S or O;

R¹ is selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein R¹ is optionally substituted with one or more, the same or different, R¹⁰;

R² is selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein R² is optionally substituted with one or more, the same or different, R¹⁰;

R⁴, R⁵, R⁶, R⁷, R⁸, and R⁹ are individually and independently selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein R⁴, R⁵, R⁶, R⁷, R⁸, and R⁹ are optionally substituted with one or more, the same or different, R¹⁰;

R¹⁰ is selected from alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein R¹⁰ is optionally substituted with one or more, the same or different, R¹¹; and R¹¹ is selected from halogen, nitro, cyano, hydroxy, trifluoromethoxy, trifluoromethyl, amino, formyl, carboxy, carbamoyl, mercapto, sulfamoyl, methyl, ethyl, propyl, tert-butyl, methoxy, ethoxy, acetyl, acetoxy, methylamino, ethylamino, dimethylamino, diethylamino, N-methyl-N-ethylamino, acetylamino, N-methylcarbamoyl, N-ethylcarbamoyl, N,N-dimethylcarbamoyl, N,N-diethylcarbamoyl, N-methyl-N-ethylcarbamoyl, methylthio, ethylthio, methylsulfinyl, ethylsulfinyl, mesyl, ethylsulfonyl, methoxycarbonyl, ethoxycarbonyl, N-methylsulfamoyl, N-ethylsulfamoyl, N,N-dimethylsulfamoyl, N,N-diethylsulfamoyl, N-methyl-N-ethylsulfamoyl, carbocyclyl, aryl, and heterocyclyl.

In certain embodiments, the compound is N-(4-(2,4-dimethylphenyl)-5-methylthiazol-2-yl)-1-naphthamide, derivatives, prodrugs, or salts thereof.

In certain embodiments, $R^2$ is phenyl, 2,4-dimethylphenyl, 2,5-dimethylphenyl, or 3,4-dimethylphenyl.

In certain embodiments, the N-(thiazol-2-yl)-carboxamide derivative is a compound having formula IF,

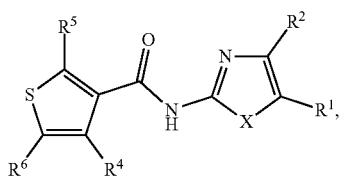

formula IF prodrug or salt thereof and a pharmaceutically acceptable excipient, wherein X is S or O;

$R^1$ is selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^1$ is optionally substituted with one or more, the same or different, $R^{10}$;

$R^2$ is selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^2$ is optionally substituted with one or more, the same or different, $R^{10}$, $R^4$, $R^5$, and $R^6$ are individually and independently selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^4$, $R^5$, and $R^6$ are optionally substituted with one or more, the same or different, $R^{10}$;

$R^{10}$ is selected from alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^{10}$ is optionally substituted with one or more, the same or different, $R^{11}$, and $R^{11}$ is selected from halogen, nitro, cyano, hydroxy, trifluoromethoxy, trifluoromethyl, amino, formyl, carboxy, carbamoyl, mercapto, sulfamoyl, methyl, ethyl, propyl, tert-butyl, methoxy, ethoxy, acetyl, acetoxy, methylamino, ethylamino, dimethylamino, diethylamino, N-methyl-N-ethylamino, acetylamino, N-methylcarbamoyl, N-ethylcarbamoyl, N,N-dimethylcarbamoyl, N,N-diethylcarbamoyl, N-methyl-N-ethylcarbamoyl, methylthio, ethylthio, methylsulfinyl, ethylsulfinyl, mesyl, ethylsulfonyl, methoxycarbonyl, ethoxycarbonyl, N-methylsulfamoyl, N-ethylsulfamoyl, N,N-dimethylsulfamoyl, N,N-diethylsulfamoyl, N-methyl-N-ethylsulfamoyl, carbocyclyl, aryl, and heterocyclyl.

In certain embodiments, the compound is N-(4-(3,4-dimethylphenyl)-5-methylthiazol-2-yl)-5-ethylthiophene-3-carboxamide, derivatives, prodrugs, or salts thereof.

In certain embodiments, the N-(thiazol-2-yl)-carboxamide derivative is a compound having formula IG,

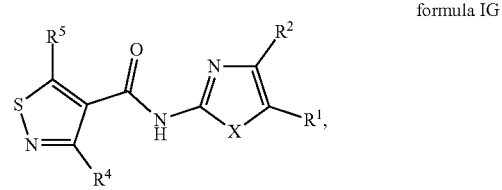

formula IG prodrug or salt thereof and a pharmaceutically acceptable excipient, wherein X is S or O;

$R^1$ is selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^1$ is optionally substituted with one or more, the same or different, $R^{10}$, $R^2$ is selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^2$ is optionally substituted with one or more, the same or different, $R^{10}$;

$R^4$ and $R^5$ are individually and independently selected from hydrogen, alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^4$ and $R^5$ are optionally substituted with one or more, the same or different, $R^{10}$;

$R^{10}$ is selected from alkyl, alkenyl, alkanoyl, halogen, nitro, cyano, hydroxy, amino, mercapto, formyl, carboxy, carbamoyl, alkoxy, alkylthio, alkylamino, dialkylamino, alkylsulfinyl, alkylsulfonyl, arylsulfonyl, carbocyclyl, aryl, and heterocyclyl wherein $R^{10}$ is optionally substituted with one or more, the same or different, $R^{11}$; and $R^{11}$ is selected from halogen, nitro, cyano, hydroxy, trifluoromethoxy, trifluoromethyl, amino, formyl, carboxy, carbamoyl, mercapto, sulfamoyl, methyl, ethyl, propyl, tert-butyl, methoxy, ethoxy, acetyl, acetoxy, methylamino, ethylamino, dimethylamino, diethylamino, N-methyl-N-ethylamino, acetylamino, N-methylcarbamoyl, N-ethylcarbamoyl, N,N-dimethylcarbamoyl, N,N-diethylcarbamoyl, N-methyl-N-ethylcarbamoyl, methylthio, ethylthio, methylsulfinyl, ethylsulfinyl, mesyl, ethylsulfonyl, methoxycarbonyl, ethoxycarbonyl, N-methylsulfamoyl, N-ethylsulfamoyl, N,N-dimethylsulfamoyl, N,N-diethylsulfamoyl, N-methyl-N-ethylsulfamoyl, carbocyclyl, aryl, and heterocyclyl.

Methods of Use

This disclosure relates to compounds that inhibit glutathione S-transferases (GSTs) and/or NAD(P)H:quinone oxidoreductase 1 (NQO1) for uses in treating cancer. In certain embodiments, this disclosure relates to methods of treating or preventing cancer comprising administering an effective amount of a compound that inhibits glutathione S-transferases (GSTs) and/or NAD(P)H:quinone oxidoreductase 1 (NQO1) to a subject in need thereof. In certain embodiments, the subject is diagnosed with cancer, brain cancer, or glioblastoma.

In certain embodiments, this disclosure relates to compositions and uses of N-(thiazol-2-yl)-carboxamide derivatives such as a N-(5-nitrothiazol-2-yl)-carboxamide derivatives for treating cancer such as glioblastoma. In certain embodiments, this disclosure relates to N-(thiazol-2-yl)-carboxamide derivatives such as a N-(5-nitrothiazol-2-yl)-carboxamide derivatives for treating or preventing metastasis, tumor growth, and/or cancer. In certain embodiments, this disclosure relates to methods of treating cancer comprising administering an effective amount of a N-(thiazol-2-yl)-carboxamide derivative to a subject in need thereof. In certain embodiments, the subject is diagnosed with brain cancer such as glioblastoma. In certain embodiments, the disclosure relates to methods of treating a cancer comprising administering an effective amount of pharmaceutical composition comprising a N-(thiazol-2-yl)-carboxamide derivative such as a N-(5-nitrothiazol-2-yl)-carboxamide derivative disclosed herein to a subject in need thereof.

In certain embodiments, the subject is at risk of, exhibiting symptoms of, or diagnosed with brain cancer, glioblastoma, breast cancer, prostate cancer, colorectal cancer, gastric cancer, lung cancer, skin cancer, bladder cancer, kidney cancer, endometrial cancer, pancreatic cancer, and thyroid cancer.

In certain embodiments, contemplated methods include further administering a second anti-cancer agent such as bevacizumab, gefitinib, erlotinib, temozolomide, docetaxel, cis-platin, 5-fluorouracil, gemcitabine, tegafur, raltitrexed, methotrexate, cytosine arabinoside, hydroxyurea, adriamycin, bleomycin, doxorubicin, daunomycin, epirubicin, idarubicin, mitomycin-C, dactinomycin, mithramycin, vincristine, vinblastine, vindesine, vinorelbine taxol, taxotere, etoposide, teniposide, amsacrine, topotecan, camptothecin, bortezomib, anagrelide, tamoxifen, toremifene, raloxifene, droloxifene, idoxifene fulvestrant, bicalutamide, flutamide, nilutamide, cyproterone, goserelin, leuprorelin, buserelin, megestrol, anastrozole, letrozole, vorozole, exemestane, finasteride, marimastat, trastuzumab, cetuximab, dasatinib, imatinib, combretastatin, thalidomide, and/or lenalidomide or combinations thereof.

In certain embodiments, the disclosure contemplates treating or preventing brain cancer, glioblastoma multiforme, oligodendroglioma, primitive neuroectodermal tumors, ependymomas, glioma comprising administering a N-(thiazol-2-yl)-carboxamide derivative such as a N-(5-nitrothiazol-2-yl)-carboxamide derivative disclosed herein, e.g., 5-methyl-N-(5-nitrothiazol-2-yl)-3-phenylisoxazole-4-carboxamide, nitazoxanide (NTZ, 2-((5-nitrothiazol-2-yl) carbamoyl)phenyl acetate) and tizoxanide (TIZ, 2-hydroxy-N-(5-nitrothiazol-2-yl)benzamide) or optionally substituted derivative or salt thereof to a subject in need thereof. In certain embodiments, the compound is optionally administered in combination with temozolomide, procarbazine, carmustine (BCNU), lomustine (CCNU), vincristine, and combinations thereof. In certain embodiments, procarbazine, lomustine (CCNU) and vincristine are combined. In certain embodiments, the compound is optionally administered in combination with irinotecan, cis-platin, carboplatin, methotrexate, etoposide, bleomycin, vinblastine, actinomycin (Dactinomycin), cyclophosphamide, or ifosfamide.

In certain embodiments, the disclosure contemplates combinations of a N-(thiazol-2-yl)-carboxamide derivative such as a N-(5-nitrothiazol-2-yl)-carboxamide derivative disclosed herein, e.g., 5-methyl-N-(5-nitrothiazol-2-yl)-3-phenylisoxazole-4-carboxamide, nitazoxanide (NTZ, 2-((5-nitrothiazol-2-yl)carbamoyl)phenyl acetate) and tizoxanide (TIZ, 2-hydroxy-N-(5-nitrothiazol-2-yl)benzamide), with temozolomide. Treatment of glioblastoma includes chemotherapy during and after radiotherapy. On average, chemotherapy after surgery and radiotherapy can initially reduce the tumor size. The use of temozolomide both during radiotherapy and for six months post radiotherapy results in a significant increase in median survival with minimal additional toxicity.

In certain embodiments, the disclosure contemplates combinations of a N-(thiazol-2-yl)-carboxamide derivative such as a N-(5-nitrothiazol-2-yl)-carboxamide derivative disclosed herein, e.g., 5-methyl-N-(5-nitrothiazol-2-yl)-3-phenylisoxazole-4-carboxamide, nitazoxanide (NTZ, 2-((5-nitrothiazol-2-yl) carbamoyl) phenyl acetate) and tizoxanide (TIZ, 2-hydroxy-N-(5-nitrothiazol-2-yl)benzamide), with bevacizumab.

In certain embodiments, the disclosure relates to administering compositions disclosed herein for the management of cancers or tumors in the brain by convection-enhanced delivery (CED). CED is a method of administrating compositions by direct infusion into the brain interstitial spaces utilizing a fluid pressure gradient after catheter placement.

In certain embodiments, the disclosure contemplates treating or preventing breast cancer using a N-(thiazol-2-yl)-carboxamide derivative such as a N-(5-nitrothiazol-2-yl)-carboxamide derivative disclosed herein and one more other anti-cancer agents. In certain embodiments, the disclosure contemplates treating or preventing breast cancer using a N-(thiazol-2-yl)-carboxamide derivative such as a N-(5-nitrothiazol-2-yl)-carboxamide derivative disclosed herein and trastuzumab and/or lapatinib. In certain embodiments, the disclosure contemplates treating or preventing breast cancer using a N-(thiazol-2-yl)-carboxamide derivative such as a N-(5-nitrothiazol-2-yl)-carboxamide derivative disclosed herein and docetaxel and cyclophosphamide. In certain embodiments, the disclosure contemplates treating or preventing breast cancer using a N-(thiazol-2-yl)-carboxamide derivative such as a N-(5-nitrothiazol-2-yl)-carboxamide derivative disclosed herein and docetaxel, carboplatin, and trastuzumab. In certain embodiments, the disclosure contemplates treating or preventing breast cancer using a N-(thiazol-2-yl)-carboxamide derivative such as a N-(5-nitrothiazol-2-yl)-carboxamide derivative disclosed herein and cyclophosphamide, doxorubicin, and 5-fluorouracil (5-FU). In certain embodiments, the disclosure contemplates treating or preventing breast cancer using a N-(thiazol-2-yl)-carboxamide derivative such as a N-(5-nitrothiazol-2-yl)-carboxamide derivative disclosed herein and docetaxel, doxorubicin, and cyclophosphamide. In certain embodiments, the disclosure contemplates treating or preventing breast cancer using a N-(thiazol-2-yl)-carboxamide derivative such as a N-(5-nitrothiazol-2-yl)-carboxamide derivative disclosed herein and doxorubicin and cyclophosphamide followed by paclitaxel or docetaxel. In certain embodiments, the disclosure contemplates treating or preventing breast cancer using a N-(thiazol-2-yl)-carboxamide derivative such as a N-(5-nitrothiazol-2-yl)-carboxamide derivative disclosed herein and 5-FU, epirubicin, and cyclophosphamide followed by docetaxel or paclitaxel.

In certain embodiments, the disclosure contemplates treating or preventing prostate cancer using a N-(thiazol-2-yl)-carboxamide derivative such as a N-(5-nitrothiazol-2-yl)-carboxamide derivative disclosed herein and one more other anti-cancer agents. In certain embodiments, the disclosure contemplates treating or preventing prostate cancer using a N-(thiazol-2-yl)-carboxamide derivative such as a N-(5-nitrothiazol-2-yl)-carboxamide derivative disclosed herein and leuprolide, goserelin, or buserelin. In certain embodiments, the disclosure contemplates treating or preventing prostate cancer using a N-(thiazol-2-yl)-carboxamide derivative such as a N-(5-nitrothiazol-2-yl)-carboxamide derivative disclosed herein and flutamide, bicalutamide, enzalutamide, or nilutamide. In certain embodiments, the disclosure contemplates treating or preventing prostate cancer using a N-(thiazol-2-yl)-carboxamide derivative such as a N-(5-nitrothiazol-2-yl)-carboxamide derivative disclosed herein and ketoconazole or aminoglutethimide. In certain embodiments, the disclosure contemplates treating or preventing prostate cancer using a N-(thiazol-2-yl)-carboxamide derivative such as a N-(5-nitrothiazol-2-yl)-carboxamide derivative disclosed herein and abiraterone, bicalutamide, cabazitaxel, bicalutamide, degarelix, denosumab, docetaxel, enzalutamide, cabazitaxel, leuprolide, prednisone, denosumab, sipuleucel-T, or radium 223 dichloride and combinations thereof.

In certain embodiments, the disclosure contemplates treating or preventing colon cancer using a N-(thiazol-2-yl)-carboxamide derivative such as a N-(5-nitrothiazol-2-yl)-carboxamide derivative disclosed herein and one more other anti-cancer agents. In certain embodiments, the disclosure contemplates treating or preventing colon cancer using a N-(thiazol-2-yl)-carboxamide derivative such as a N-(5-nitrothiazol-2-yl)-carboxamide derivative disclosed herein and 5-FU, leucovorin, or capecitabine or combinations thereof. In certain embodiments, the disclosure contemplates treating or preventing colon cancer using a N-(thiazol-2-yl)-carboxamide derivative such as a N-(5-nitrothiazol-2-yl)-carboxamide derivative disclosed herein and capecitabine and oxaliplatin. In certain embodiments, the disclosure contemplates treating or preventing colon cancer using a N-(thiazol-2-yl)-carboxamide derivative such as a N-(5-nitrothiazol-2-yl)-carboxamide derivative disclosed herein and 5-FU, leucovorin, and oxaliplatin. In certain embodiments, the disclosure contemplates treating or preventing colon cancer using a N-(thiazol-2-yl)-carboxamide derivative such as a N-(5-nitrothiazol-2-yl)-carboxamide derivative disclosed herein and leucovorin, 5-FU, and irinotecan. In certain embodiments, the disclosure contemplates treating or preventing colon cancer using a N-(thiazol-2-yl)-carboxamide derivative such as a N-(5-nitrothiazol-2-yl)-carboxamide derivative disclosed herein and leucovorin, 5-FU, oxaliplatin, and irinotecan.

In certain embodiments, the disclosure contemplates treating or preventing colon cancer using a N-(thiazol-2-yl)-carboxamide derivative such as a N-(5-nitrothiazol-2-yl)-carboxamide derivative disclosed herein and bevacizumab or cetuximab. In certain embodiments, the disclosure contemplates treating or preventing colon cancer using a N-(thiazol-2-yl)-carboxamide derivative such as a N-(5-nitrothiazol-2-yl)-carboxamide derivative disclosed herein and 5-FU and leucovorin optionally with bevacizumab. In certain embodiments, the disclosure contemplates treating or preventing colon cancer using a N-(thiazol-2-yl)-carboxamide derivative such as a N-(5-nitrothiazol-2-yl)-carboxamide derivative disclosed herein and capecitabine optionally with bevacizumab. In certain embodiments, the disclosure contemplates treating or preventing colon cancer using a N-(thiazol-2-yl)-carboxamide derivative such as a N-(5-nitrothiazol-2-yl)-carboxamide derivative disclosed herein and irinotecan optionally with cetuximab. In certain embodiments, the disclosure contemplates treating or preventing colon cancer using a N-(thiazol-2-yl)-carboxamide derivative such as a N-(5-nitrothiazol-2-yl)-carboxamide derivative disclosed herein and cetuximab. In certain embodiments, the disclosure contemplates treating or preventing colon cancer using a N-(thiazol-2-yl)-carboxamide derivative such as a N-(5-nitrothiazol-2-yl)-carboxamide derivative disclosed herein and panitumumab. In certain embodiments, the disclosure contemplates treating or preventing colon cancer using a N-(thiazol-2-yl)-carboxamide derivative such as a N-(5-nitrothiazol-2-yl)-carboxamide derivative disclosed herein and regorafenib.

In certain embodiments, the disclosure contemplates treating or preventing lung cancer using a N-(thiazol-2-yl)-carboxamide derivative such as a N-(5-nitrothiazol-2-yl)-carboxamide derivative disclosed herein and a chemotherapy agent is selected from vinorelbine, etoposide, mitomycin C, gemcitabine, irinotecan, pemetrexed, gefitinib, erlotinib, lapatinib, crizotinib, and a *vinca* alkaloid or combinations thereof. In certain embodiments, the *vinca* alkaloid is vinblastine, vincristine, vindesine, or vinorelbine. In certain embodiments, the disclosure contemplates treating or preventing lung cancer using a N-(thiazol-2-yl)-carboxamide derivative such as a N-(5-nitrothiazol-2-yl)-carboxamide derivative disclosed herein and chemotherapy agent is bevacizumab panitumumab, zalutumumab, nimotuzumab, matuzumab, or cetuximab. In certain embodiments, the disclosure contemplates treating or preventing lung cancer using a N-(thiazol-2-yl)-carboxamide derivative such as a N-(5-nitrothiazol-2-yl)-carboxamide derivative disclosed herein and a platinum-based agent and/or a taxane e.g., paclitaxel and docetaxel or combinations thereof.

The combination therapy also contemplates use of the disclosed pharmaceutical compositions with radiation therapy or surgery, as an alternative, or a supplement, to a second therapeutic or chemotherapeutic agent.

In certain embodiments, the disclosure contemplates treating or preventing leukemia using a N-(thiazol-2-yl)-carboxamide derivative such as a N-(5-nitrothiazol-2-yl)-carboxamide derivative disclosed herein and a leukemia (CLL) chemotherapeutic plan. A typical chronic lymphocytic leukemia (CLL) chemotherapeutic plan includes combination chemotherapy with chlorambucil or cyclophosphamide, plus a corticosteroid such as prednisone or prednisolone. The use of a corticosteroid has the additional benefit of suppressing some related autoimmune diseases, such as immunohemolytic anemia or immune-mediated thrombocytopenia. In resistant cases, single-agent treatments with nucleoside drugs such as fludarabine, pentostatin, or cladribine may be successful. Patients may consider allogeneic or autologous bone marrow transplantation. In certain embodiments, the disclosure contemplates combination treatments using compounds disclosed herein in combination with chlorambucil, cyclophosphamide, prednisone, prednisolone, fludarabine, pentostatin, and/or cladribine or combinations thereof. Treatment of acute lymphoblastic leukemia typically includes chemotherapy to bring about bone marrow remission. Typical regiments include prednisone, vincristine, and an anthracycline drug, L-asparaginase or cyclophosphamide. Other options include prednisone, L-asparaginase, and vincristine. Consolidation therapy or intensification therapy to eliminate any remaining leukemia may include antimetabolite drugs such as methotrexate and 6-mercaptopurine (6-MP).

In certain embodiments, the disclosure contemplates combination treatments using a N-(thiazol-2-yl)-carboxamide derivative such as a N-(5-nitrothiazol-2-yl)-carboxamide derivative disclosed herein in combination with COP, CHOP, R-CHOP, imatinib, alemtuzumab, vincristine, L-asparaginase or cyclophosphamide, methotrexate and/or 6-mercaptopurine (6-MP). COP refers to a chemotherapy regimen used in the treatment of lymphoma of cyclophosphamide, vincristine, and prednisone or prednisolone and optionally hydroxydaunorubicin (CHOP) and optionally rituximab (R-CHOP).

Pharmaceutical Compositions

In certain embodiments, the disclosure relates to pharmaceutical compositions comprising a compound disclosed herein and a pharmaceutically acceptable excipient. In certain embodiments, the pharmaceutical composition is in the form of a pill, capsule, tablet, or saline aqueous buffer.

In certain embodiments, the pharmaceutically acceptable excipient is selected from a saccharide, disaccharide, sucrose, lactose, glucose, mannitol, sorbitol, polysaccharides, starch, cellulose, microcrystalline cellulose, cellulose ether, hydroxypropyl cellulose (HPC), xylitol, sorbitol, maltito, gelatin, polyvinylpyrrolidone (PVP), polyethylene glycol (PEG), hydroxypropyl methylcellulose (HPMC), crosslinked sodium carboxymethyl cellulose, dibasic calcium phosphate, calcium carbonate, stearic acid, magnesium stearate, talc, magnesium carbonate, silica, vitamin A, vitamin E, vitamin C, retinyl palmitate, selenium, cysteine, methionine, citric acid, and sodium citrate, methyl paraben, propyl paraben, and combinations thereof.

Pharmaceutical compositions disclosed herein may be in the form of pharmaceutically acceptable salts, as generally described below. Some preferred, but non-limiting examples of suitable pharmaceutically acceptable organic and/or inorganic acids are hydrochloric acid, hydrobromic acid, sulfuric acid, nitric acid, acetic acid and citric acid, as well as other pharmaceutically acceptable acids known per se (for which reference is made to the references referred to below).

When the compounds of the disclosure contain an acidic group as well as a basic group, the compounds of the disclosure may also form internal salts, and such compounds are within the scope of the disclosure. When the compounds of the disclosure contain a hydrogen-donating heteroatom (e.g. NH), the disclosure covers salts and/or isomers formed by transfer of said hydrogen atom to a basic group or atom within the molecule.

Pharmaceutically acceptable salts of the compounds include the acid addition and base salts thereof. Suitable acid addition salts are formed from acids which form non-toxic salts. Examples include the acetate, adipate, aspartate, benzoate, besylate, bicarbonate/carbonate, bisulphate/sulphate, borate, camsylate, citrate, cyclamate, edisylate, esylate, formate, fumarate, gluceptate, gluconate, glucuronate, hexafluorophosphate, hibenzate, hydrochloride/chloride, hydrobromide/bromide, hydroiodide/iodide, isethionate, lactate, malate, maleate, malonate, mesylate, methylsulphate, naphthylate, 2-napsylate, nicotinate, nitrate, orotate, oxalate, palmitate, pamoate, phosphate/hydrogen phosphate/ dihydrogen phosphate, pyroglutamate, saccharate, stearate, succinate, tannate, tartrate, tosylate, trifluoroacetate and xinofoate salts. Suitable base salts are formed from bases which form non-toxic salts. Examples include the aluminium, arginine, benzathine, calcium, choline, diethylamine, diolamine, glycine, lysine, magnesium, meglumine, olamine, potassium, sodium, tromethamine and zinc salts. Hemisalts of acids and bases may also be formed, for example, hemisulphate and hemicalcium salts. For a review on suitable salts, see Handbook of Pharmaceutical Salts: Properties, Selection, and Use by Stahl and Wermuth (Wiley-VCH, 2002), incorporated herein by reference.

The compounds described herein may be administered in the form of prodrugs. A prodrug may include a covalently bonded carrier which releases the active parent drug when administered to a mammalian subject. Prodrugs may be prepared by modifying functional groups present in the compounds in such a way that the modifications are cleaved, either in routine manipulation or in vivo, to the parent compounds. Prodrugs include, for example, compounds wherein a hydroxy group is bonded to any group that, when administered to a mammalian subject, cleaves to form a free hydroxy group. Examples of prodrugs include, but are not limited to, acetate, formate and benzoate derivatives of alcohol functional groups in the compounds. Methods of structuring a compound as prodrugs may be found in the book of Testa and Mayer, Hydrolysis in Drug and Prodrug Metabolism, Wiley (2006). Typical prodrugs form the active metabolite by transformation of the prodrug by hydrolytic enzymes, the hydrolysis of amide, lactams, peptides, carboxylic acid esters, epoxides or the cleavage of esters of inorganic acids. It is well within the ordinary skill of the art to make an ester prodrug, e.g., acetyl ester of a free hydroxy group. It is well known that ester prodrugs are readily degraded in the body to release the corresponding alcohol. See e.g., Imai, Drug Metab Pharmacokinet. (2006) 21(3): 173-85, entitled "Human carboxylesterase isozymes: catalytic properties and rational drug design."

Pharmaceutical compositions for use in the present disclosure typically comprise an effective amount of a compound and a suitable pharmaceutical acceptable carrier. The preparations may be prepared in a manner known per se, which usually involves mixing the at least one compound according to the disclosure with the one or more pharmaceutically acceptable carriers, and, if desired, in combination with other pharmaceutical active compounds, when necessary under aseptic conditions. Reference is made to U.S. Pat. Nos. 6,372,778, 6,369,086, 6,369,087 and 6,372,733 and the further references mentioned above, as well as to the standard handbooks, such as the latest edition of Remington's Pharmaceutical Sciences.

Generally, for pharmaceutical use, the compounds may be formulated as a pharmaceutical preparation comprising at least one compound and at least one pharmaceutically acceptable carrier, diluent or excipient and/or adjuvant, and optionally one or more further pharmaceutically active compounds.

The pharmaceutical preparations of the disclosure are preferably in a unit dosage form, and may be suitably packaged, for example in a box, blister, vial, bottle, sachet, ampoule or in any other suitable single-dose or multi-dose holder or container (which may be properly labeled); optionally with one or more leaflets containing product information and/or instructions for use. Generally, such unit dosages will contain between 1 and 1000 mg, and usually between 5 and 500 mg, of the at least one compound of the disclosure, e.g. about 10, 25, 50, 100, 200, 300 or 400 mg per unit dosage.

The compounds may be administered by a variety of routes including the oral, ocular, rectal, transdermal, subcutaneous, intravenous, intramuscular or intranasal routes, depending mainly on the specific preparation used. The compound will generally be administered in an "effective amount", by which is meant any amount of a compound that, upon suitable administration, is sufficient to achieve the desired therapeutic or prophylactic effect in the subject to which it is administered. Usually, depending on the condition to be prevented or treated and the route of administration, such an effective amount will usually be between 0.01 to 1000 mg per kilogram body weight of the patient per day, more often between 0.1 and 500 mg, such as between 1 and 250 mg, for example about 5, 10, 20, 50, 100, 150, 200 or 250 mg, per kilogram body weight of the patient per day, which may be administered as a single daily dose, divided over one or more daily doses. The amount(s) to be administered, the route of administration and the further treatment regimen may be determined by the treating clinician, depending on factors such as the age, gender and general condition of the patient and the nature and severity of the disease/symptoms to be treated. Reference is made to U.S. Pat. Nos. 6,372,778, 6,369,086, 6,369,087 and 6,372,733 and the further references mentioned above, as well as to the standard handbooks, such as the latest edition of Remington's Pharmaceutical Sciences.

For an oral administration form, the compound may be mixed with suitable additives, such as excipients, stabilizers or inert diluents, and brought by means of the customary methods into the suitable administration forms, such as tablets, coated tablets, hard capsules, aqueous, alcoholic, or oily solutions. Examples of suitable inert carriers are magnesia, magnesium carbonate, potassium phosphate, lactose, glucose, or starch, in particular, corn starch. In this case, the preparation may be carried out both as dry and as moist granules. Suitable oily excipients or solvents are vegetable or animal oils, such as sunflower oil or cod liver oil. Suitable solvents for aqueous or alcoholic solutions are water, ethanol, sugar solutions, or mixtures thereof. Polyethylene glycols and polypropylene glycols are also useful as further auxiliaries for other administration forms. As immediate release tablets, these compositions may contain microcrystalline cellulose, dicalcium phosphate, starch, magnesium stearate and lactose and/or other excipients, binders, extenders, disintegrants, diluents and lubricants known in the art.

When administered by nasal aerosol or inhalation, the compositions may be prepared according to techniques well-known in the art of pharmaceutical formulation and may be prepared as solutions in saline, employing benzyl alcohol or other suitable preservatives, absorption promoters to enhance bioavailability, fluorocarbons, and/or other solubilizing or dispersing agents known in the art. Suitable pharmaceutical formulations for administration in the form of aerosols or sprays are, for example, solutions, suspensions or emulsions of the compounds of the disclosure or their physiologically tolerable salts in a pharmaceutically acceptable solvent, such as ethanol or water, or a mixture of such solvents. If required, the formulation may contain other pharmaceutical auxiliaries such as surfactants, emulsifiers and stabilizers as well as a propellant.

For subcutaneous or intravenous administration, the compounds, if desired with the substances customary therefore such as solubilizers, emulsifiers or further auxiliaries are brought into solution, suspension, or emulsion. The compounds may also be lyophilized and the lyophilizates obtained used, for example, for the production of injection or infusion preparations. Suitable solvents are, for example, water, physiological saline solution or alcohols, e.g. ethanol, propanol, glycerol, sugar solutions such as glucose or mannitol solutions, or mixtures of the various solvents mentioned. The injectable solutions or suspensions may be formulated according to known art, using suitable non-toxic, parenterally-acceptable diluents or solvents, such as mannitol, 1,3-butanediol, water, Ringer's solution or isotonic sodium chloride solution, or suitable dispersing or wetting and suspending agents, such as sterile, bland, fixed oils, including synthetic mono- or diglycerides, and fatty acids, including oleic acid.

When rectally administered in the form of suppositories, the formulations may be prepared by mixing the compounds with a suitable non-irritating excipient, such as cocoa butter, synthetic glyceride esters or polyethylene glycols, which are solid at ordinary temperatures, but liquefy and/or dissolve in the rectal cavity to release the drug.

In certain embodiments, it is contemplated that these compositions may be extended release formulations. Typical extended release formations utilize an enteric coating. Typically, a barrier is applied to oral medication that controls the location in the digestive system where it is absorbed. Enteric coatings prevent release of medication before it reaches the small intestine. Enteric coatings may contain polymers of polysaccharides, such as maltodextrin, xanthan, scleroglucan dextran, starch, alginates, pullulan, hyaluronic acid, chitin, chitosan and the like; other natural polymers, such as proteins (albumin, gelatin etc.), poly-L-lysine; sodium poly (acrylic acid); poly(hydroxyalkylmethacrylates) (for example poly(hydroxyethyl methacrylate)); carboxypolymethylene (for example Carbopol™); carbomer; polyvinylpyrrolidone; gums, such as guar gum, gum arabic, gum karaya, gum ghatti, locust bean gum, tamarind gum, gellan gum, gum tragacanth, agar, pectin, gluten and the like; poly(vinyl alcohol); ethylene vinyl alcohol; polyethylene glycol (PEG); and cellulose ethers, such as hydroxymethylcellulose (HMC), hydroxyethylcellulose (HEC), hydroxypropylcellulose (HPC), methylcellulose (MC), ethylcellulose (EC), carboxyethylcellulose (CEC), ethylhydroxyethylcellulose (EHEC), carboxymethylhydroxyethylcellulose (CMHEC), hydroxypropylmethyl-cellulose (HPMC), hydroxypropylethylcellulose (HPEC) and sodium carboxymethylcellulose (Na CMC); as well as copolymers and/or (simple) mixtures of any of the above polymers. Certain of the above-mentioned polymers may further be crosslinked by way of standard techniques.

The choice of polymer will be determined by the nature of the active ingredient/drug that is employed in the composition of the invention as well as the desired rate of release. In particular, it will be appreciated by the skilled person, for example in the case of HPMC, that a higher molecular weight will, in general, provide a slower rate of release of drug from the composition. Furthermore, in the case of HPMC, different degrees of substitution of methoxy groups and hydroxypropoxyl groups will give rise to changes in the rate of release of drug from the composition. In this respect, and as stated above, it may be desirable to provide compositions of the invention in the form of coatings in which the polymer carrier is provided by way of a blend of two or more polymers of, for example, different molecular weights in order to produce a particular required or desired release profile.

Microspheres of polylactide, polyglycolide, and their copolymers poly(lactide-co-glycolide) may be used to form sustained-release protein or compound delivery systems. Proteins and/or compounds may be entrapped in the poly (lactide-co-glycolide) microsphere depot by a number of methods, including formation of a water-in-oil emulsion with water-borne protein and organic solvent-borne polymer (emulsion method), formation of a solid-in-oil suspension with solid protein dispersed in a solvent-based polymer solution (suspension method), or by dissolving the protein in a solvent-based polymer solution (dissolution method). One may attach poly(ethylene glycol) to proteins (PEGylation) to increase the in vivo half-life of circulating therapeutic proteins and decrease the chance of an immune response.

Dual Inhibitor of NQO1 and GSTP1 for Treating Malignant Glioblastoma

EGFRvIII over-expression in glioblastoma cells caused increased levels of reactive oxygen species (ROS), DNA strand break accumulation, and genome instability. Cellular oxidative stress is generated by the imbalance of the redox status of the cell. ROS are derived from enzymatic reactions involving NADPH dependent oxidases NAD(P)H: quinone oxidoreductase I (NQO1), which is a cytosolic reductase.

The main molecular and genetic features of primary GBM are represented by: amplification of epidermal growth factor receptor (EGFR), deletion or mutation of homozygous cyclin dependent kinase (CDK) inhibitor p16INK4A (CDKN2A), alterations in phosphatase and tension homo log (PTEN) on chromosome 10, and deletion of INK4a. As a Receptor tyrosine kinase (RTK), EGFR is implicated in cell growth and proliferation through downstream effectors such as Ras and PI-3-Kinase (PI3K) and are modulated by tumor suppressor genes NF1 and PTEN. PTEN suppresses the PI3K/Akt pathway via dephosphorylating $PIP_3$ (phosphatidyl-3,4,5-triphosphate) into $PIP_2$ (phosphatidyl-4,5-diphosphate).

Reactive oxygen species (ROS) is a type of unstable molecule that contains oxygen and that easily reacts with other molecules in a cell. The reduction of molecular oxygen ($O_2$) produces superoxide ($\cdot O_2^-$) and is the precursor of most other reactive oxygen species. Maintaining ROS homeostasis is crucial for cell growth and survival. In GBM, amplification of EGFR mutations, such as EGFRvIII, leads to the ROS imbalance, leading to the cellular oxidative stress and DNA damages. ROS are derived from enzymatic reactions involving NADPH quinone oxidoreductase 1 (NQO1), which was over-expressed in many human cancers. Inhibition of NQO1 can lead to the cell apoptosis.

Glutathione S-transferases (GSTs) are a family of enzymes that play an important role in detoxification by catalyzing the conjugation of many hydrophobic and electrophilic compounds with reduced glutathione. Based on their biochemical, immunologic, and structural properties, the soluble GSTs are categorized into four main classes: alpha, mu, pi, and theta. The glutathione S-transferase pi gene (GSTP1) is a polymorphic gene encoding active, functionally different GSTP1 variant proteins that play a role in susceptibility to cancer, and other diseases. Mutations of GSTP1 have been reported in various cancers. In GBM, glutathione S-transferase Pi 1 (GSP1) are commonly upregulated. Both NQO1 and GSTP1 are phase II detoxification enzymes that eliminate the formation of ROS and promotes GBM cell proliferation. Therefore, inhibition of the combination of NQO1 and GSTP1 may be used in cancer therapy.

Experiments indicate that both NQO1 and GSTP1 were overexpressed in GBM, which inhibit the oxidative stress and prevent cancer cell death. Compounds which act as NQO1 and GSTP1 dual inhibitors suppress the proliferation and stimulated apoptosis in U87MG/EGFRVIII cells. The co-crystal structures between 5-methyl-N-(5-nitro-thiazol-2-yl)-3-phenylisoxazole-4-carboxamide (MNPC) and NQO1 and GSTP1 proteins revealed that it blocked the active enzymatic sites in both enzymes. Remarkably, MNPC prolonged the survival rate for the GBM animal models. Thus, these experiments indicate that a small dual inhibitor for both NQO1 and GSTP1 disrupting the redox homeostasis might be an innovative strategy for GBM therapy.

Figure 1A:
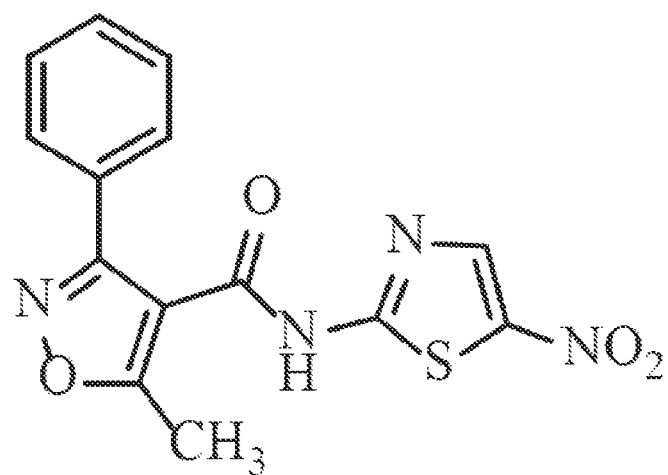
FIG. 1A illustrates the chemical structure of the compound 5-methyl-N-(5-nitrothiazol-2-yl)-3-phenylisoxazole-4-carboxamide (MNPC).
Figure 1B:
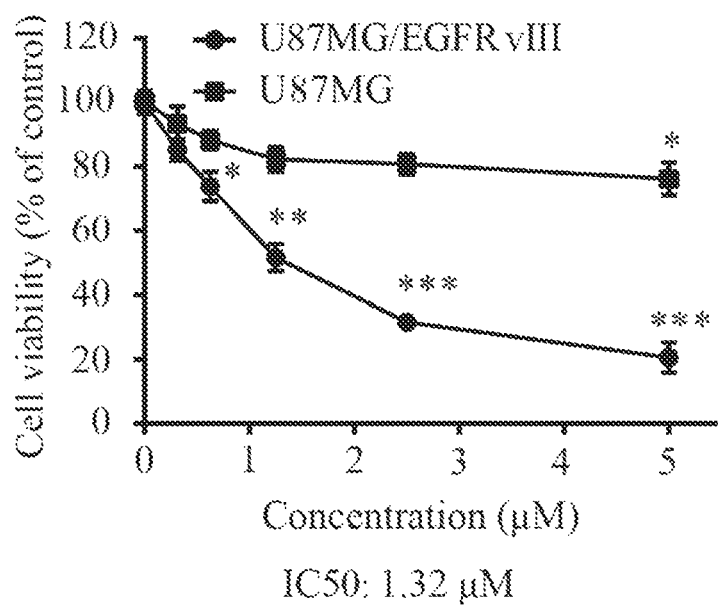
FIG. 1B shows data on the effect of MNPC (0, 0.3125, 0.625, 1.25, 2.5, 5 µM for 72 hours) on the proliferation of U87MG/EGFRvIII and U87MG cells.
Figure 1C:
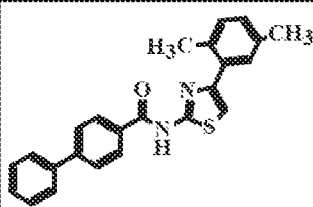
FIG. 1C shows structures and $IC_{50}$ of inhibition activity of compound derivatives in U87MG/EGFRvIII and U87MG cells.
Figure 1C:
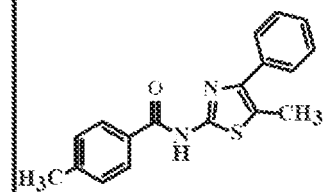
Figure 1C:
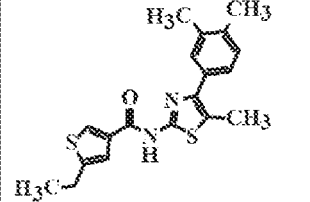
Figure 1C:
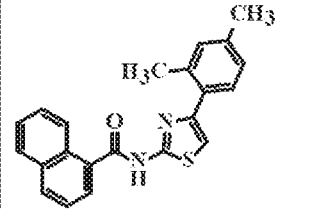
Figure 1C:
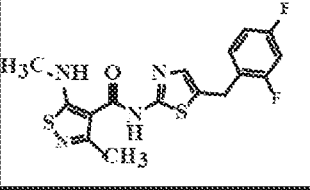
Figure 1C:
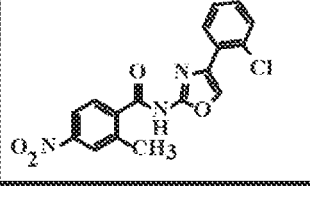
Figure 1D:
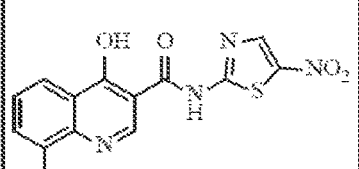
FIG. 1D shows structures and $IC_{50}$ of inhibition activity of compound derivatives in U87MG/EGFRvIII and U87MG cells.
Figure 1D:
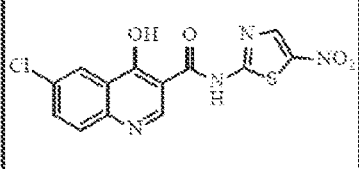
Figure 1D:
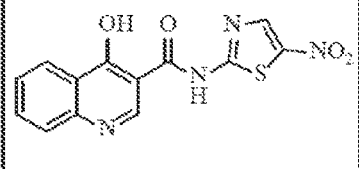
Figure 1D:
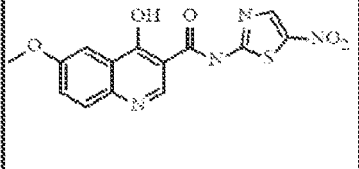
Figure 1D:
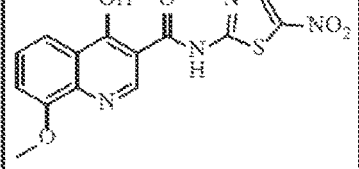
Figure 1G:
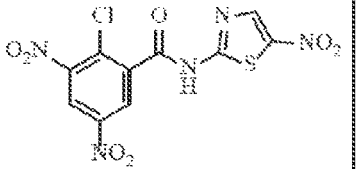
FIG. 1G shows structures and $IC_{50}$ of inhibition activity of compound derivatives in U87MG/EGFRvIII and U87MG cells.
Figure 1G:
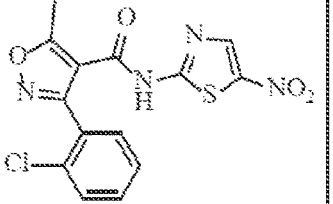
Figure 1G:
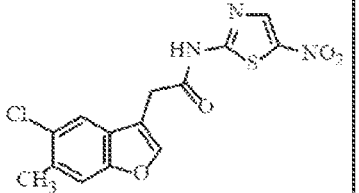
Figure 1G:
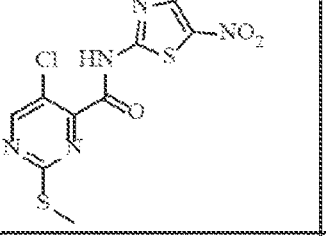
Figure 1G:
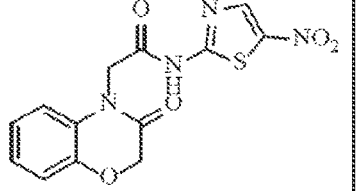

High Throughput Screening for Small Molecules that Selectively Inhibit Proliferation of U87MG/EGFRvIII Cells Versus U87MG Cells To search for the pharmacological agents effective in treating the most malignant form of GBM, an ultra-high throughput screen (uHTS) and testing funnels were employed to identify the small molecules as potential GBM therapeutics, which differentially inhibited the proliferation of U87MG/EGFRvIII cells against U87MG parent cells. After screening positive hits were obtained that showed >50% inhibition of cell viability in U87MG/EGFRvIII cells but <25% inhibition of U87MG cells. After structure-activity relationship (SAR) analysis, it was identified that that most compounds contained two aromatic rings bridged through an amide group. Namely, these compounds possessed N-phenylbenzamide or N-phenylthiophene/furan-2-carboxamide moieties. The representative compound MNPC (5-methyl-N-(5-nitro-thiazol-2-yl-3-phenylisoxazole-4-carboxamide) displayed an $IC_{50}$ of 1.32 µM in inhibiting U87MG/EGFRvIII cell proliferation (FIGS. 1A, 1B and 1C). Structure-activity relationship (SAR) studies demonstrated that 3-phenyl-5-methyl isoxazole group and the nitro group on MNPC could be replaced (FIG. 1D).

Noticeably, compared to oxazole, thiazole substitution increased the inhibitory effect, indicating that increase of the atom size in X position elevates its binding to the target. Hence, the promising anti-cancer compound MNPC was selected for further study.

Nqo1 and GSTP1 are the Major MNPC-Binding Targets

Figure 2A:
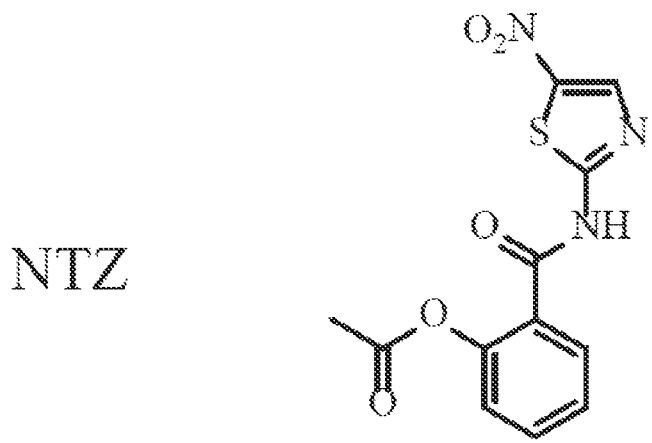
FIG. 2A shows the structure and $IC_{50}$ of inhibition activity of NTZ in U87MG/EGFRvIII and U87MG cells.
Figure 2A:
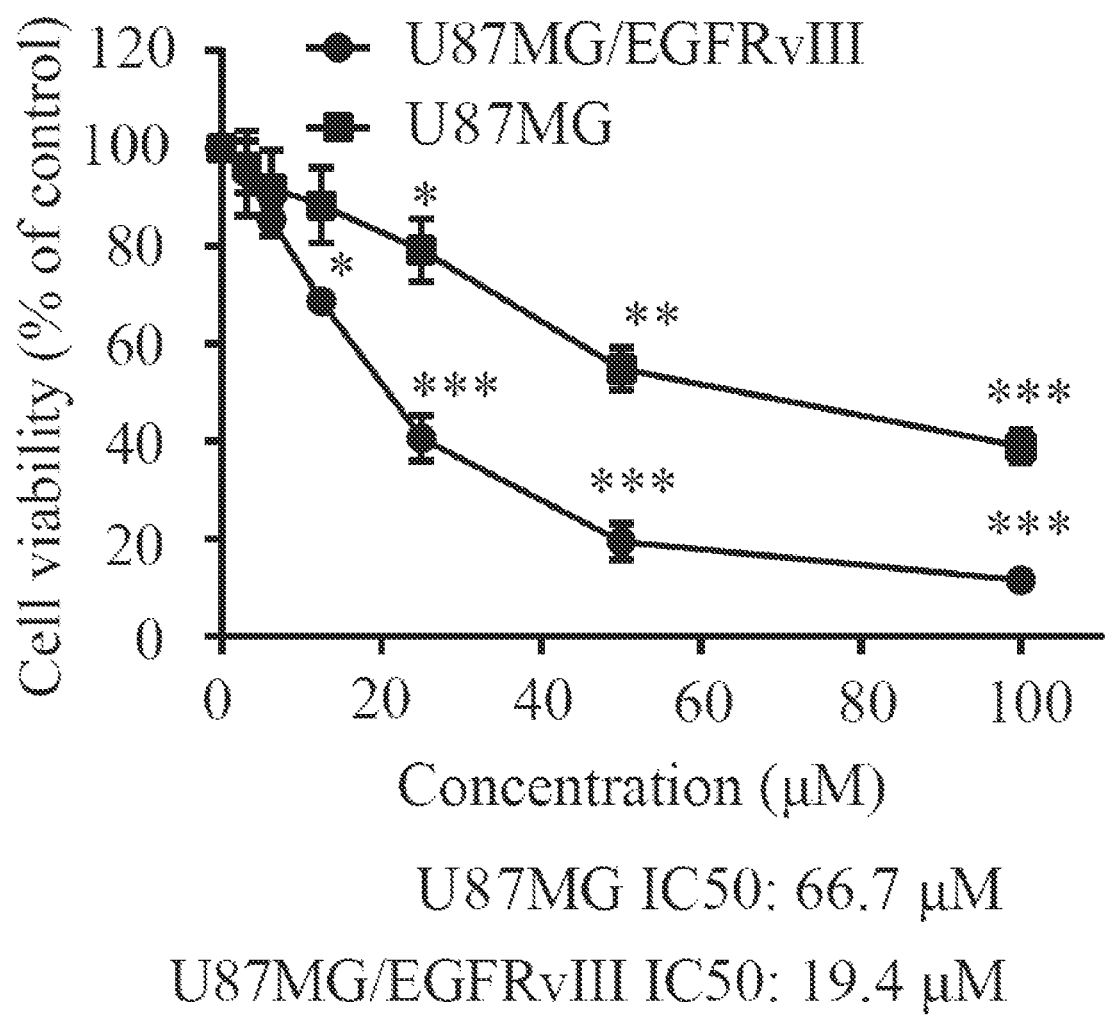
Figure 2B:
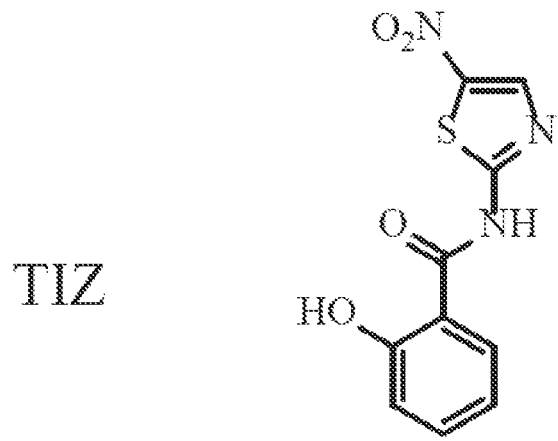
FIG. 2B shows the structure and $IC_{50}$ of inhibition activity of TIZ in U87MG/EGFRVIII and U87MG cells.
Figure 2B:
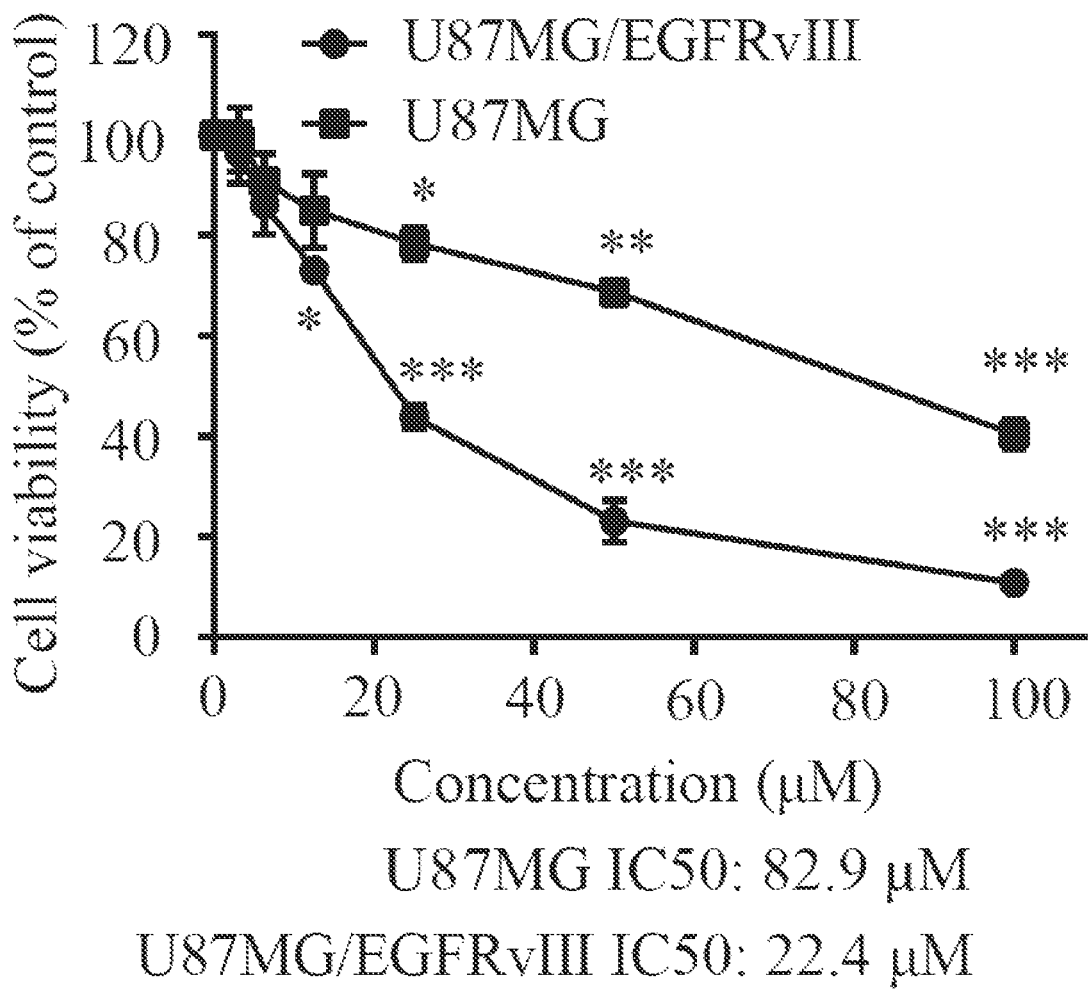

Identifying the cellular targets of the compounds was investigated. Experiments indicate that nitazoxanide (NTZ), tizoxanide (TIZ), two drugs for treating antiparasitic and *cryptosporidium*-infection, displayed the comparable antiproliferative activities toward U87MG/EGFRvIII cells as MNPC (FIGS. 2A and B). This finding support that (5-nitro-thiazol-4-carboxamide) is a pharmacophore for MNPC to exert its anti-cancer activity. Accordingly, TIZ was covalently coupled to the epoxy-agarose via its phenol group and prepared the affinity chromatography. U87MG/EGFRvIII cytoplasmic extracts were subjected to this affinity column and the selectively bound compounds were eluted via competition using free high concentration of MNPC solution. It is worth noting that two major proteins with molecular weight of 24 kDa and 29 kDa, visualized by silver staining, were specifically occurred in MNPC fraction but not control fraction. Proteomic analysis of the eluted proteins revealed their identities: NQO1 and GSTP1. To determine whether MNPC indeed specifically binds to NQO1 and GSTP1, the BIACORE binding assay was performed by immobilizing MNPC to the chip and found that MNPC exhibited high-affinity to NQO1 recombinant proteins with Kd 90.84 nM and GSTP1 89.57 nM, respectively.

Mnpc Inhibits Both NQO1 and GSTP1 and Induces the Oxidative Stress in U87MG/EGFRvIII Cells To explore the anti-proliferative effects of MNPC, U87MG/EGFRVIII cells were treated with different doses of MNPC (0, 0.1, 0.5, 1 and 5 µM) for 5 days. MNPC dose-dependently inhibited cell proliferation. Asparagine endopeptidase (AEP) is frequently overexpressed in numerous human cancers and mediates cancer cell invasion and metastasis. Nonetheless, cell invasion assay and AEP enzymatic activity assay revealed no significant difference by MNPC. Hence, MNPC might block cancer cell viability without impinging on the cell invasion. Since NQO1 and GSTP1 are the major binding proteins of MNPC, in vitro reductase enzyme activity assays with purified recombinant proteins was conducted. MNPC inhibited NQO1 and GSTP1 activities with IC50 values of 0.926 µM and 0.797 µM, respectively. NQO1 also acts as an antioxidant enzyme by regenerating antioxidant forms of ubiquinone and vitamin E quinone. To explore whether the oxidative stress levels are correlated with the expression levels of antioxidant enzymes: NQO1 and GSTP1, the cellular ROS concentrations and cytotoxicity after MNPC treatment was examined. Remarkably, MNPC increased ROS levels and escalated LDH and Carbonyl Expression in U87MG/EGFR cells, and it down-regulated GSH/GSSH ratios in a dose-dependent manner. Hence, MNPC may regulate the oxidative stress and balance the redox homeostasis via inhibiting both NQO1 and GSTP1. Notably, the protein levels of NQO1 and GSTP1 were not changed upon MNPC treatment. Thus, MNPC inhibits GSTP1 and NQ01 enzyme activities without altering their protein levels. Interestingly, MNPC treatment induced caspase-3 activation in U87MG/EGFRvIII cells, indicating that active oxidative stress triggers apoptosis. The results were also confirmed by TUNEL assay. Thus, MNPC dose-dependently increases the cell apoptosis and exerts its growth inhibitory effect via inhibiting both NQO1 and GSTP1. These findings suggest that reducing oxidative stress by reductive enzymes like NQO1 and GSTP1 is important for the GBM cell proliferation.

Nqo1 and GSTP1 Expression Regulates GBM Cancer Progression In Vivo

To further examine the effects of NQO1 and GSTP1 on U87MG/EGFRVIII cancer cell proliferation in vivo, the stable knockdown cell lines with their specific shRNAs were constructed. The transfected efficiency was validated by fluorescence microscopy and Western blotting. U87MG/EGFRvIII cells stably transfected with sh-NQO1 or sh-GSTP1 or both were subcutaneously inoculated into nude mice. Representative photographs of mice from each group were taken at the endpoint. During this study, there was no drastic change in their body weights among the groups. knockdown of NQO1 and GSTP1 significantly decreased the tumor volumes (FIG. 3A), and the tumor weight growth curve showed the same pattern as the tumor volumes (FIG. 3B). H&E staining of tumor slices in both knockdown groups revealed severe tumor tissue damages and morphology differences as compared to other groups. Concurrently, IHC (immunohistochemistry) with Ki67 showed significant reduction in the number of proliferating cells. TUNEL assay indicated extensive apoptosis in tumor tissues, suggesting that depletion of both NQO1 and GSTP1 triggers more extensive apoptotic cell death than other groups. Thus, NQO1 and GSTP1 play an important role for EGFR-amplified GBM cell survival, supporting that they are the promising targets for the most malignant GBM therapy.

Nqo1 and GSTP1 are Highly Expressed in GBM and Serve as a Prognostic Biomarker

To gain the insight into the roles of NQO1 and GSTP1 in human GBM, a dataset accessible via The Cancer Genome Atlas (TCGA) featuring expression as well as clinical patient data was analyzed. When compared with normal brain tissues, both NQO1 and GSTP1 were highly expressed in GBM patient samples, but there was no significant difference between the genders. However, NQO1 expression only slightly changed in different ages of patients. The correlation of tumor's NQO1 and GSTP1 expression with clinical data showed that they might function as prognostic molecular markers in GBM patients. The low expression levels of NQO1 and GSTP1 in tumors were associated with significantly longer overall survival (the length of time from either the date of diagnosis or the start of treatment for cancer, that patients diagnosed with the disease are still alive). Similar decrease trend was shown in the disease-free survival (the length of time after primary treatment for cancer ends that the patient survives without any signs or symptoms of that cancer). Notably, NQO1 and GSTP1 expression levels were significantly increased in the high-grade samples from patients compared to low-grade samples. Consistent with findings in primary GBM cells, a significant positive correlation was observed between the expression of NQO1 and GSTP1. The experiments suggest that NQO1 and GSTP1 are upregulated in the GBM tissues of patients, and patients with high NQO1 and GSTP1 expression show a low survival rate.

Mnpc Suppresses Tumor Growth of U87MG/EGFRvIII Cells and Elongates the Life Span To assess the therapeutic potential of MNPC, a murine intracranial xenograft model was used, inoculated with U87MG/EGFRvIII cells. After 7 days of brain injection of the GBM cells and the tumor formation, the animals were treated with vehicle or different doses of MNPC (3 or 10 mg/kg) every 2 days for a total of 10 times. MNPC displayed a dose-dependent anti-tumor effect with higher concentration and more robust inhibitory effect on tumor growth (FIG. 4C). Markedly, MNPC significantly increased the survival rates and the body weight especially with the 10 mg/kg group (FIGS. 4A and 4B). The ROS levels and signaling cascades were examined in the tissue samples derived from tumors extracted from MNPC or vehicle-treated mice. MNPC strongly increased ROS levels and activated apoptotic caspase 3.

What is claimed is:

1. A pharmaceutical composition comprising a compound 5-methyl-N-(5-nitrothiazol-2-yl)-3-phenylisoxazole-4-carboxamide or salt thereof.

2. The pharmaceutical composition of claim 1 in the form of a pill, capsule, or tablet.

3. The pharmaceutical composition of claim 1 in the form of a saline aqueous buffer.

4. The pharmaceutical composition of claim 1, wherein the pharmaceutically acceptable excipient is selected from a saccharide, disaccharide, or polysaccharide.

5. The pharmaceutical composition of claim 1, wherein the pharmaceutically acceptable excipient is sucrose, lactose, glucose, mannitol, sorbitol, xylitol, or maltitol.

6. The pharmaceutical composition of claim 1, wherein the pharmaceutically acceptable excipient is gelatin.

7. The pharmaceutical composition of claim 1, wherein the pharmaceutically acceptable excipient is polyvinylpyrrolidone (PVP).

8. The pharmaceutical composition of claim 1, wherein the pharmaceutically acceptable excipient is cellulose, microcrystalline cellulose, cellulose ether, hydroxypropyl cellulose (HPC), hydroxypropyl methylcellulose (HPMC), or crosslinked sodium carboxymethyl cellulose.

9. The pharmaceutical composition of claim 1, wherein the pharmaceutically acceptable excipient is polyethylene glycol (PEG).

10. The pharmaceutical composition of claim 1, wherein the pharmaceutically acceptable excipient is dibasic calcium phosphate, calcium carbonate, or magnesium carbonate.

11. The pharmaceutical composition of claim 1, wherein the pharmaceutically acceptable excipient is stearic acid or magnesium stearate.

12. The pharmaceutical composition of claim 1, wherein the pharmaceutically acceptable excipient is talc or silica.

13. The pharmaceutical composition of claim 1, wherein the pharmaceutically acceptable excipient is vitamin A or vitamin E.

14. The pharmaceutical composition of claim 1, wherein the pharmaceutically acceptable excipient is vitamin C.

15. The pharmaceutical composition of claim 1, wherein the pharmaceutically acceptable excipient is retinyl palmitate.

16. The pharmaceutical composition of claim 1, wherein the pharmaceutically acceptable excipient is selenium.

17. The pharmaceutical composition of claim 1, wherein the pharmaceutically acceptable excipient is cysteine or methionine.

18. The pharmaceutical composition of claim 1, wherein the pharmaceutically acceptable excipient is citric acid or sodium citrate.

19. The pharmaceutical composition of claim 1, wherein the pharmaceutically acceptable excipient is methyl paraben or propyl paraben.

* * * * *